United States Patent
Nishiyama et al.

(10) Patent No.: US 10,274,923 B2
(45) Date of Patent: Apr. 30, 2019

(54) CPU OF PLC, SYSTEM PROGRAM FOR PLC, AND RECORDING MEDIUM STORING SYSTEM PROGRAM FOR PLC

(71) Applicant: OMRON CORPORATION, Kyoto (JP)

(72) Inventors: Yoshihide Nishiyama, Kanagawa (JP); Osamu Hamasaki, Kyoto (JP); Shigeyuki Eguchi, Kyoto (JP); Yoshihide Tamura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 919 days.

(21) Appl. No.: 14/017,684

(22) Filed: Sep. 4, 2013

(65) Prior Publication Data

US 2014/0005835 A1 Jan. 2, 2014

Related U.S. Application Data

(63) Continuation of application No. PCT/JP2011/056768, filed on Mar. 22, 2011.

(30) Foreign Application Priority Data

Mar. 15, 2011 (JP) ................. 2011-056766

(51) Int. Cl.
*G05B 19/05* (2006.01)
*G05B 19/414* (2006.01)

(52) U.S. Cl.
CPC ....... *G05B 19/056* (2013.01); *G05B 19/4145* (2013.01); *G05B 2219/34287* (2013.01)

(58) Field of Classification Search
CPC ............. G05B 19/056; G05B 19/4145; G05B 2219/34287
(Continued)

(56) References Cited

U.S. PATENT DOCUMENTS

| 6,021,464 A * | 2/2000 | Yao ............ G06F 3/0619 348/E5.008 |
| 2002/0082721 A1 * | 6/2002 | Amrhein ......... G05B 19/056 700/28 |

(Continued)

FOREIGN PATENT DOCUMENTS

| EP | 0757305 A1 * | 2/1997 | ........ G05B 19/056 |
| JP | 2004-259112 | 9/2004 | |

(Continued)

OTHER PUBLICATIONS

Stern "Electric Circuits", Sep. 2009, downloaded from <http://www.phy6.org/Electric/-E3-circuit.htm> on Oct. 30, 2018 (Year: 2009).*

(Continued)

*Primary Examiner* — Jason D Mitchell
(74) *Attorney, Agent, or Firm* — Greenblum & Bernstein, P.L.C.

(57) ABSTRACT

A scheduler program includes a command to start execution of a motion calculation program in each motion control cycle, a command to cause a microprocessor to start execution of a first user program in each first user program execution control cycle, and a command to repeat output processing and input processing, start of execution of the first user program, end of execution of the first user program, and start of execution of the motion calculation program in this sequence for every period corresponding to the period of the first user program execution cycle.

12 Claims, 16 Drawing Sheets

(58) Field of Classification Search
USPC .......................................................... 700/87
See application file for complete search history.

(56) References Cited

U.S. PATENT DOCUMENTS

| | | | |
|---|---|---|---|
| 2003/0225812 A1* | 12/2003 | Nagashima | G05B 19/4147 718/102 |
| 2004/0210326 A1* | 10/2004 | Muneta | G05B 19/058 700/82 |
| 2005/0097233 A1* | 5/2005 | Oka | G05B 19/054 710/9 |
| 2005/0201408 A1* | 9/2005 | Otani | G05B 19/042 370/438 |
| 2009/0150705 A1* | 6/2009 | Gmeiner | G05B 19/41825 713/400 |
| 2011/0225595 A1* | 9/2011 | Chujo | G05B 19/0426 718/106 |
| 2012/0239201 A1* | 9/2012 | Kobayashi | G05B 19/056 700/275 |
| 2012/0239978 A1* | 9/2012 | Narutani | G06F 11/3612 714/32 |

FOREIGN PATENT DOCUMENTS

| | | | | |
|---|---|---|---|---|
| JP | 2006048231 A | * | 2/2006 | ........... G05B 19/418 |
| JP | 2007-140655 | | 6/2007 | |
| JP | 2008-146357 | | 6/2008 | |

OTHER PUBLICATIONS

U.S. Appl. No. 14/017,904 to Yoshihide Nishiyama et al., filed Sep. 4, 2013.
U.S. Appl. No. 14/017,720 to Yoshihide Nishiyama et al., filed Sep. 4, 2013.
U.S. Appl. No. 14/017,929 to Yoshihide Nishiyama et al., filed Sep. 4, 2013.
International Search Report in PCT/JP2011/056768, along with English language translation, dated Jun. 14, 2011.
International Preliminary Report on Patentability in PCT/JP2011/056768, along with English language translation, dated Feb. 10, 2012.

* cited by examiner

US 10,274,923 B2

CPU OF PLC, SYSTEM PROGRAM FOR PLC, AND RECORDING MEDIUM STORING SYSTEM PROGRAM FOR PLC

RELATED APPLICATIONS

This application is a continuation application of International Application No. PCT/JP2011/056768, filed Mar. 22, 2011, and claims the benefit of Japanese Application No. 2011-056766, filed Mar. 15, 2011, the disclosures of which are incorporated by reference herein in their entireties.

TECHNICAL FIELD

The present invention relates to scheduling of control operations, including output processing, input processing, and calculation processing, in a PLC (Programmable Logic Controller, also referred to as a programmable controller) used to control operations of a machine or facility.

BACKGROUND ART

A PLC includes a plurality of units, such as, for example, a CPU (Central Processing Unit) and an I/O (Input/Output) unit, the CPU including a microprocessor that executes user programs, the I/O unit inputting signals from an external switch or sensor and outputting signals to an external relay or actuator. The PLC exchanges data among the units through a PLC system bus and/or a field network in each user program execution cycle and executes control operations.

In operation control of a machine or facility, motion control is sometimes included to control motion of a motor. Such motion control, specifically, control processing to periodically output an instruction value to a motor driver that drives a motor (execution of a motion calculation program) is conventionally performed on a motion controller provided separately from the PLC. In a field of information technology, meanwhile, speed of a microprocessor and communication network have been increasing. The technology in such a field has also become available in the PLC for execution of not only a user program but also a motion calculation program in one microprocessor.

For example, Patent Literature 1 (Japanese Patent Laid-Open Publication No. 2007-140655) discloses a configuration in which one CPU processes a motion control function that controls a motor and a PLC function that executes sequence calculation (user program). More specifically, Patent Literature 1 discloses that "periodic motion control processing and respective axis processing" and "high-speed sequence processing" are executed in each base clock cycle, and "low-speed sequence processing" or "non-periodic motion control processing" is executed during a remaining time in each base clock cycle.

CITATION LIST

Patent Literature

Patent Literature 1: Japanese Patent Laid-Open Publication No. 2007-140655

SUMMARY OF INVENTION

Technical Problem

To integrate a function that executes a motion calculation program into a microprocessor of a PLC, a configuration is naturally considered in which, similar to a conventional motion controller, an instruction value for a motor driver is calculated and a calculation result is output in a short constant period of an execution cycle, and a user program is executed and other PLC operations are performed during a remaining time of each execution cycle. Due to the limited length of the remaining time in each execution cycle, however, all processes required for the PLC to operate cannot be performed in each execution cycle. In such a case, it is unclear what process should be executed in the remaining time of which execution cycle. In addition, input processing and output processing are necessary to execute the user program, and at least output processing (input processing as well in some cases) is necessary to execute motion calculation. However, the timing is also unclear to execute the processing above.

Patent Literature 1 above does not disclose specific details of processing assumed in each of the "periodic motion control processing and respective axis processing," "high-speed sequence processing," "low-speed sequence processing," and "non-periodic motion control processing." In light of the specific details of processing, in particular, it is unclear how the "high-speed sequence processing" is distinguished from the "low-speed sequence processing" and what processes are assumed in the "non-periodic motion control processing." Furthermore, it is also unclear how and when input and output are performed for each processing.

In the conventional case where the motion controller is provided separately from the PLC, the PLC and the motion controller operate in execution cycles asynchronous to each other. In general, the PLC operates in an execution cycle of a longer period. In such a case, a function of the PLC to execute the user program in motion control is to give the motion controller a start instruction for one operation according to a type of motion command and parameters when executing a motion command in the user program. For instance, the PLC gives the motion controller an instruction based on a motion command to "move from coordinate A to coordinate B according to a specified speed change." In response to the instruction, the motion controller calculates and outputs to a servo motor driver a position instruction value (may be a speed instruction value or torque instruction value depending on the command) in each execution cycle of the motion controller to achieve the motion of the command. Once the start instruction is given, the motion controller repeats calculation and output of an instruction value in the execution cycle thereof until completing execution of the motion command.

In the PLC having the motion control function, meanwhile, when the execution cycle of the motion calculation program is set to be a cycle common throughout operations of the PLC, a relatively short user program is known to be executable in each execution cycle from Patent Literature 1. Leveraging this aspect, the inventors of the present invention have found a possibility to perform more sophisticated motion control.

Specifically, specifications of a motion command generally define a method of supplying input parameters and calculation details using the input parameters. A motion calculation program actually performs calculation as detailed in such a motion command. The motion calculation program itself is generally provided by a PLC manufacturer and is not readily developed by a user. Meanwhile, a user program is freely programmable by a user. Then, when a portion of calculation details associated with calculation of a motion instruction value in each execution cycle is defined in the user program and then the motion calculation program and the user program are executed synchronously, a degree of freedom in motion control can be enhanced. Accordingly, this leads to a possibility of achieving motion control suitable for control demanded by an individual user.

In addition, in a case where the user program pertains to calculation of the motion instruction value, the inventors of the present invention have also found that simply synchronizing execution of the user program and motion calculation does not suffice and that a wasteful time that delays control is generated unless each processing, including input processing and output processing, is executed in an appropriate sequence.

An object of the present invention is to provide an appropriate execution sequence of each processing, including input processing and output processing, for a user program executed in synchronization with a motion calculation program to calculate a motion instruction value by using input data for motion control in a CPU of a PLC, and thus to shorten a time required by the CPU from input of the input data for motion control to output of motion instruction value data that reflects the input data.

Solution to Problem

An aspect of the present invention provides a CPU unit of a PLC having a motion control function to control motion of a motor. The CPU unit of the PLC includes a microprocessor, a memory means, and a communication circuit. The CPU unit of the PLC is configured to be capable of repeatedly performing output processing of motion instruction value data and input processing of input data for motion control and executing a motion calculation program for every motion control cycle having a constant period. Further, the CPU unit of the PLC is configured to be capable of repeatedly executing a first user program for every first user program execution cycle having a period of integral multiple of the period of the motion control cycle, the first user program being created according to a purpose of control by a user and including processing of providing an instruction required for execution of the motion calculation program. The memory means stores a system program and the first user program. The system program includes the motion calculation program and a scheduler program controlling execution of the first user program and the motion calculation program. The microprocessor executes the system program and the first user program stored in the memory means. The communication circuit transmits the motion instruction value data as at least a portion of the output processing and receives the input data for motion control as at least a portion of the input processing in each motion control cycle. The scheduler program includes a command to cause the microprocessor to start execution of the motion calculation program in each motion control cycle, a command to cause the microprocessor to start execution of the first user program in each first user program execution control cycle, and a command to repeat the output processing and the input processing, start of execution of the first user program, end of execution of the first user program, and start of execution of the motion calculation program in this sequence for every period corresponding to the period of the first user program execution cycle. Accordingly, in a case where the first user program includes processing of calculating user program output data used by the motion calculation program by using the input data for motion control, a time required from start of the input processing to end of the output processing of the motion instruction value data reflecting the input data for motion control input in the input processing corresponds to the period of the first user program execution cycle.

Preferably, the period of the first user program execution cycle is equal to the period of the motion control cycle. Setting the period of the first user program execution cycle as above allows calculation of motion instruction value data by using updated user program output data in each execution of the motion calculation program. Specifically, updated motion instruction value data can be output in each output processing.

Further preferably, the scheduler program includes a command to cause the microprocessor to execute the first user program and the motion calculation program in this sequence after the output processing and the input processing in the motion control cycle. This command allows the output processing and the input processing associated with motion control, preceding execution of the first user program and the motion calculation program in the motion control cycle, thus reducing a variation in an input and output communication cycle. Accordingly, motion of the motor can be controlled more precisely.

Further preferably, the memory means further stores a second user program created according to a purpose of control by a user, not including processing of calculating the user program output data used by the motion calculation program by using the input data for motion control, and having a second user program execution cycle having a period of integral multiple of two or more of the period of the motion control cycle. In a case where the second user program is stored in the memory means, the scheduler program causes the microprocessor to start execution of the second user program during a remaining time from first end of execution of the motion calculation program to end of the motion control cycle in the second user program execution cycle, and when there is an unexecuted portion in the second user program during a remaining time after end of execution of the motion calculation program in the motion control cycle thereafter, the scheduler program causes the microprocessor to start execution of the unexecuted portion.

The CPU unit of the PLC according to the present aspect can increase processing speed by creating user programs as below. Specifically, the first user program includes the command to calculate the user program output data used for calculation in the motion calculation program by using the input data for motion control, while the second user program includes the command to perform an entirety or portion of processing other than included in the first user program. Then, compared to a case where the first user program includes commands to perform all processing, a processing load assigned to the first user program is reduced, and thus an execution time of the first user program can be reduced. Accordingly, this leads to a possibility of further reducing the period of the motion control cycle.

Preferably, the period of the first user program execution cycle is equal to an integral multiple of two or more of the period of the motion control cycle. Setting the period of the first user program execution cycle as above allows output of updated motion instruction value data in a shorter control period than the execution period of the user program.

Further preferably, the scheduler program includes a command to cause the microprocessor to execute the motion calculation program, perform the output processing and the input processing, and execute the first user program in this sequence in the first user program execution cycle. As a result, the motion calculation program, the output processing and input processing, and the first user program are executed in this sequence in each motion control cycle as well. In each motion control cycle, a time after the execution of the output processing and input processing until the end of the motion control cycle may vary depending on the motion control cycle. This command, however, allows the time to be used for execution of the user program with no waste. Thus, a standby time is unlikely to occur in the microprocessor, thus leading to a possibility of a further reduction in the user program execution cycle.

Another aspect of the present invention provides a PLC system program executed in a CPU unit of a PLC having a motion control function to control motion of a motor. The CPU unit of the PLC includes a memory means storing a first user program, a microprocessor, and a communication circuit. The CPU unit of the PLC is configured to be capable of repeatedly performing output processing of motion instruction value data and input processing of input data for motion control and executing a motion calculation program for every motion control cycle having a constant period. Further, the CPU unit of the PLC is configured to be capable of repeatedly executing the first user program for every first user program execution cycle having a period of integral multiple of the period of the motion control cycle, the first user program being created according to a purpose of control by a user and including processing of providing an instruction required for execution of the motion calculation program. The PLC system program includes the motion calculation program and a scheduler program controlling execution of the first user program and the motion calculation program. The communication circuit transmits the motion instruction value data as at least a portion of the output processing and receives the input data for motion control as at least a portion of the input processing in each motion control cycle. The scheduler program includes a command to cause the microprocessor to start execution of the motion calculation program in each motion control cycle, a command to cause the microprocessor to start execution of the first user program in each first user program execution control cycle, and a command to repeat the output processing and the input processing, start of execution of the first user program, end of execution of the first user program, and start of execution of the motion calculation program in this sequence for every period corresponding to the period of the first user program execution cycle. Accordingly, in a case where the first user program includes processing of calculating user program output data used by the motion calculation program by using the input data for motion control, a time required from start of the input processing to end of the output processing of the motion instruction value data reflecting the input data for motion control input in the input processing corresponds to the period of the first user program execution cycle.

Preferably, the period of the first user program execution cycle is equal to the period of the motion control cycle.

Further preferably, the scheduler program includes a command to cause the microprocessor to execute the first user program and the motion calculation program in this sequence after the output processing and the input processing in the motion control cycle.

Further preferably, in a case where a second user program is stored in the memory means, the second user program being created according to a purpose of control by a user, not including processing of calculating the user program output data used by the motion calculation program by using the input data for motion control, and having a second user program execution cycle having a period of integral multiple of two or more of the period of the motion control cycle, the scheduler program causes the microprocessor to start execution of the second user program during a remaining time from first end of execution of the motion calculation program to end of the motion control cycle in the second user program execution cycle, and when there is an unexecuted portion in the second user program during a remaining time after end of execution of the motion calculation program in the motion control cycle thereafter, the scheduler program causes the microprocessor to start execution of the unexecuted portion.

Preferably, the period of the first user program execution cycle is equal to an integral multiple of two or more of the period of the motion control cycle.

Further preferably, the scheduler program includes a command to cause the microprocessor to execute the motion calculation program, perform the output processing and the input processing, and execute the first user program in this sequence in the first user program execution cycle.

Another aspect of the present invention further provides a recording medium storing a PLC system program executed in a CPU unit of a PLC having a motion control function to control motion of a motor. The CPU unit of the PLC includes a memory means storing a first user program, a microprocessor, and a communication circuit. The CPU unit of the PLC is configured to be capable of repeatedly performing output processing of motion instruction value data and input processing of input data for motion control and executing a motion calculation program for every motion control cycle having a constant period. Further, the CPU unit of the PLC is configured to be capable of repeatedly executing the first user program for every first user program execution cycle having a period of integral multiple of the period of the motion control cycle, the first user program being created according to a purpose of control by a user and including processing of providing an instruction required for execution of the motion calculation program. The PLC system program includes the motion calculation program and a scheduler program controlling execution of the first user program and the motion calculation program. The communication circuit transmits the motion instruction value data as at least a portion of the output processing and receives the input data for motion control as at least a portion of the input processing in each motion control cycle. The scheduler program includes a command to cause the microprocessor to start execution of the motion calculation program in each motion control cycle, a command to cause the microprocessor to start execution of the first user program in each first user program execution control cycle, and a command to repeat the output processing and the input processing, start of execution of the first user program, end of execution of the first user program, and start of execution of the motion calculation program in this sequence for every period corresponding to the period of the first user program execution cycle. Accordingly, in a case where the first user program includes processing of calculating user program output data used by the motion calculation program by using the input data for motion control, a time required from start of the input processing to end of the output processing of the motion instruction value data reflecting the input data for motion control input in the input processing corresponds to the period of the first user program execution cycle.

Preferably, the period of the first user program execution cycle is equal to the period of the motion control cycle.

Further preferably, the scheduler program includes a command to cause the microprocessor to execute the first user program and the motion calculation program in this sequence after the output processing and the input processing in the motion control cycle.

Further preferably, in a case where a second user program is stored in the memory means, the second user program being created according to a purpose of control by a user, not including processing of calculating the user program output data used by the motion calculation program by using the input data for motion control, and having a second user program execution cycle having a period of integral multiple of two or more of the period of the motion control cycle, the scheduler program causes the microprocessor to start execution of the second user program during a remaining time from first end of execution of the motion calculation program to end of the motion control cycle in the second user program execution cycle, and when there is an unexecuted portion in the second user program during a remaining time after end of execution of the motion calculation program in the motion control cycle thereafter, the scheduler program causes the microprocessor to start execution of the unexecuted portion.

Preferably, the period of the first user program execution cycle is equal to an integral multiple of two or more of the period of the motion control cycle.

Further preferably, the scheduler program includes a command to cause the microprocessor to execute the motion calculation program, perform the output processing and the input processing, and execute the first user program in this sequence in the first user program execution cycle.

Moreover, in the present specification "command" ("meirei" in Japanese) is not limited to individual commands appearing in source code of a program in order to achieve a given function, but instead also refers to an aggregation of such individual commands, mathematical functions, and the like and may be expressed in a plural form, as in "instructions" in English, for example.

Advantageous Effects of Invention

According to the present invention, in a case where a first user program includes processing of calculating user program output data used by a motion calculation program by using input data for motion control in a CPU of a PLC, a period of time from input processing to output processing of motion instruction value data reflecting the input data for motion control can be reduced to a short period of time corresponding to a period of an execution cycle of the user program.

DESCRIPTION OF EMBODIMENTS

Figure 1:
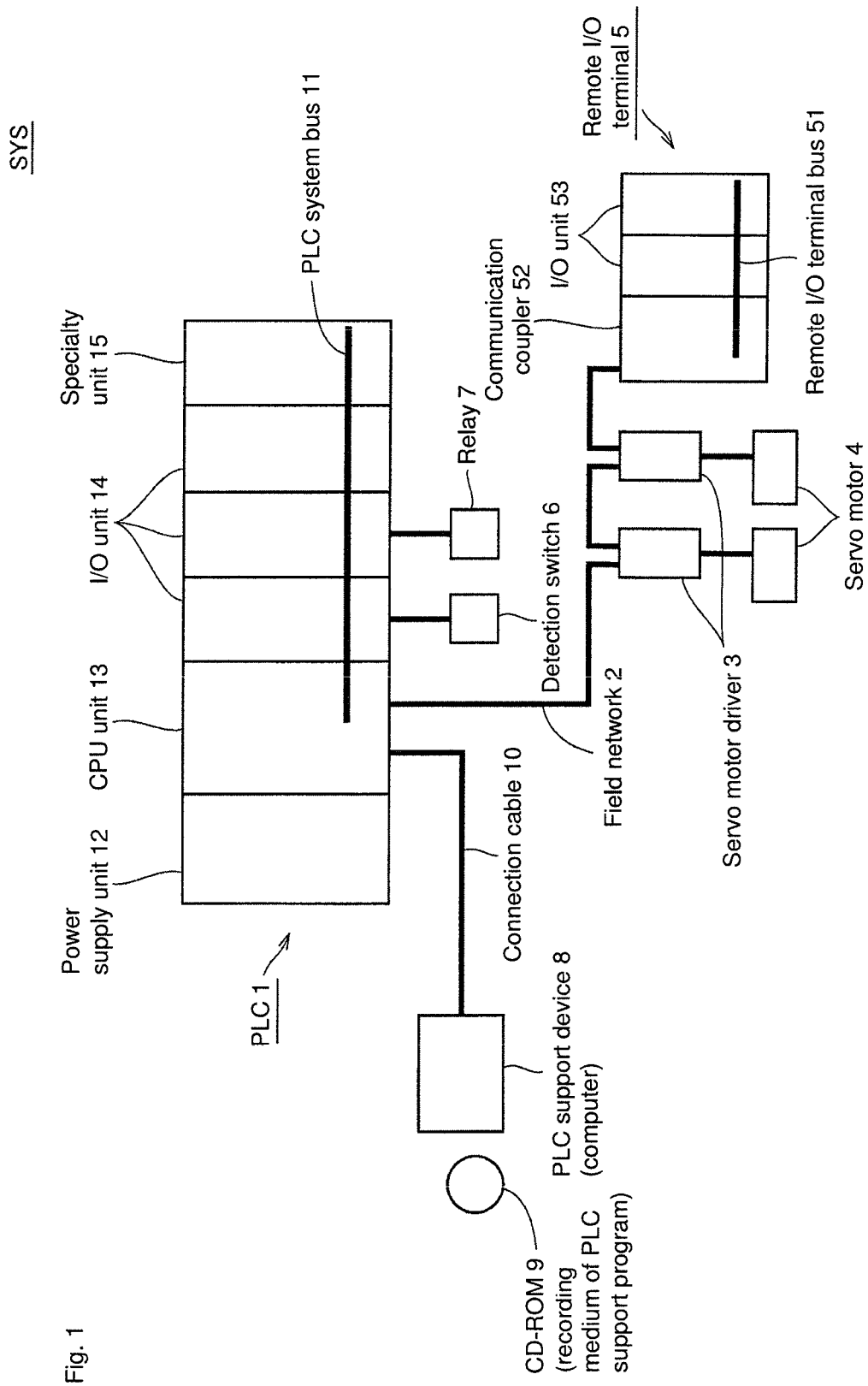
FIG. 1 A schematic view illustrating an overview configuration of a PLC system according to embodiments of the present invention.

A detailed description of embodiments according to the present invention is given with reference to the drawings. Identical or equivalent portions in the drawings are given identical reference numerals and descriptions thereof are not reiterated.

<A. System Configuration>

A PLC according to the present embodiments has a motion control function that controls motion of a motor. First, with reference to FIG. 1, a description is given of a system configuration of a PLC 1 according to the present embodiments.

FIG. 1 is a schematic view illustrating an overview configuration of a PLC system according to embodiments of the present invention. With reference to FIG. 1, a PLC system SYS includes the PLC 1, a servo motor driver 3 and remote I/O terminal 5 connected to the PLC 1 by a field network 2, and a detection switch 6 and relay 7 configuring a field instrument. In addition, a PLC support device 8 is connected to the PLC 1 via a connection cable 10 or the like.

The PLC 1 includes a CPU unit 13 executing a principal calculation process, one or more I/O units 14, and a specialty unit 15. These units are configured so as to be capable of mutually exchanging data via a PLC system bus 11. Further, power of an appropriate voltage is supplied to these units by a power supply unit 12. Each unit configuring the PLC 1 is provided by a PLC manufacturer; therefore, the PLC system bus 11 is typically independently developed and used by the PLC manufacturer. In contrast, the field network 2 described below is often capable of connecting products from different manufacturers and standards for these products are often publicly available.

Details of the CPU unit 13 are noted below with reference to FIG. 2.

The I/O unit 14 is a unit related to general input/output processing and handles input/output of data binarized to be ON or OFF. In other words, the I/O unit 14 collects information about whether a sensor such as the detection switch 6 is detecting some target (is ON) or not detecting some target (is OFF). In addition, the I/O unit 14 outputs to an output destination (such as the relay 7 or an actuator) one of an instruction to activate (ON) and an instruction to deactivate (OFF).

The specialty unit 15 includes functions not supported by the I/O unit 14, such as input/output of analog data, temperature control, and communication using a specific communication method.

The field network 2 transmits various kinds of data exchanged with the CPU unit 13. As the field network 2, typically, various kinds of industrial Ethernets® can be used. Known examples of the industrial Ethernet® include EtherCAT®, Profinet IRT, MECHATROLINK®-III, Powerlink, SERCOS®-III, and CIP Motion, any of which may be used. Moreover, a field network other than the industrial Ethernet® may also be used. For example, when motion control is not performed, DeviceNet, CompoNet/IP®, or the like may be used. In the PLC system SYS according to the present embodiments, a representative example is given in the present embodiments of a configuration where the industrial Ethernet® EtherCAT® is used as the field network 2.

FIG. 1 illustrates the PLC system SYS including both the PLC system bus 11 and the field network 2. Alternatively, a system configuration may be employed in which only one of the PLC system bus 11 and the field network 2 is provided. For instance, the field network 2 may be connected to all units. Alternatively, instead of using the field network 2, the servo motor driver 3 may be directly connected to the PLC system bus 11. Furthermore, a communication unit of the field network 2 may be connected to the PLC system bus 11 to communicate with devices connected to the field network 2 by way of the communication unit from the CPU unit 13.

In addition, by allocating functions of the I/O unit 14 and the servo motor driver 3 to the CPU unit 13, the PLC 1 may have a configuration in which the CPU unit 13 directly controls a control target without mediation by the I/O unit 14, the servo motor driver 3, or the like.

The servo motor driver 3 is connected to the CPU unit 13 via the field network 2, and also drives the servo motor 4 according to an instruction value from the CPU unit 13. More specifically, the servo motor driver 3 receives from the PLC 1 on a fixed cycle an instruction value such as a position instruction value, speed instruction value, and torque instruction value. Further, the servo motor driver 3 obtains, from a detector such as a position sensor (rotary encoder) or torque sensor connected to a shaft of the servo motor 4, an actual measured value for movement of the servo motor 4 such as position, speed (typically calculated based on a difference between a current location and a previous location), and torque. Also, the servo motor driver 3 sets the instruction value from the CPU unit 13 to a desired value, then performs feedback control to produce a feedback value from the actual measured value. In other words, the servo motor driver 3 adjusts an electric current driving the servo motor 4 such that the actual measured value approaches the desired value. Moreover, the servo motor driver 3 may also be called a servo motor amplifier.

FIG. 1 depicts an exemplary system in which the servo motor 4 and the servo motor driver 3 are combined. However, other configurations can also be used, such as a system in which a pulse motor and a pulse motor driver are combined.

The remote I/O terminal 5 is further connected to the field network 2 of the PLC system SYS shown in FIG. 1. The remote I/O terminal 5, basically, performs processes related to general input/output processing similar to the I/O unit 14. More specifically, the remote I/O terminal 5 includes a communication coupler 52 for performing a process related to data transmission in the field network 2, and one or more I/O units 53. These units are configured so as to be capable of mutually exchanging data via a remote I/O terminal bus 51.

The PLC support device 8 is described below.

<B. Hardware Configuration of CPU Unit>

Figure 2:
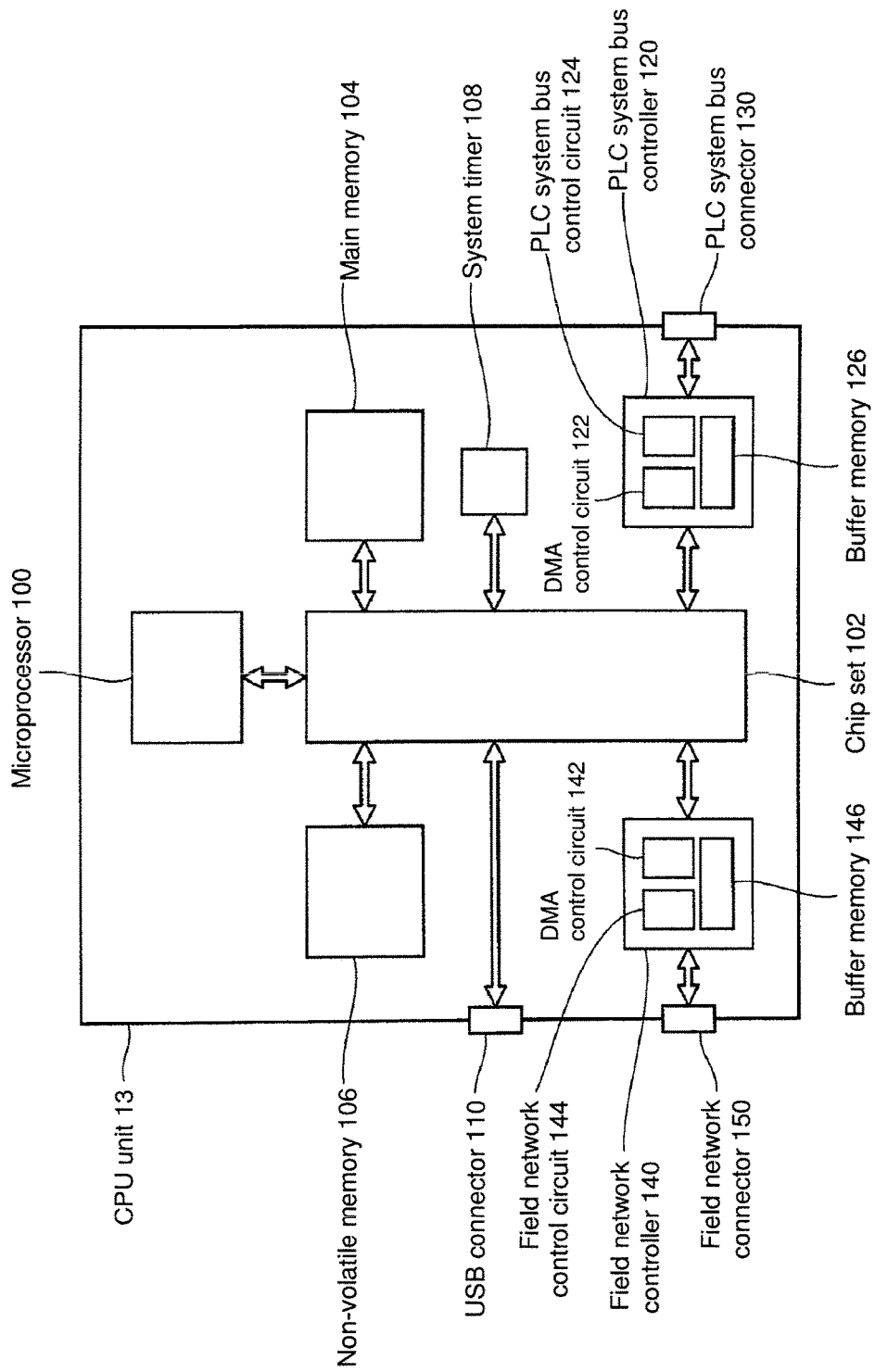
FIG. 2 A schematic view illustrating a hardware configuration of a CPU unit according to the embodiments of the present invention.

Next, with reference to FIG. 2, a description is given of a hardware configuration of the CPU unit 13. FIG. 2 is a schematic view illustrating a hardware configuration of the CPU unit 13 according to embodiments of the present invention. With reference to FIG. 2, the CPU unit 13 includes a microprocessor 100, a chip set 102, a main memory 104, a non-volatile memory 106, a system timer 108, a PLC system bus controller 120, a field network controller 140, and a USB connector 110. Connections between the chip set 102 and other components are each made by various types of bus.

The microprocessor 100 and the chip set 102, typically, are configured according to a universal computer architecture. In other words, the microprocessor 100 interprets and executes an instruction code serially supplied from the chip set 102 according to an internal clock. The chip set 102 exchanges internal data with various connected components and also generates the required instruction code for the microprocessor 100. Moreover, the chip set 102 includes a function caching data and the like obtained as a result of executing a calculation process in the microprocessor 100.

The CPU unit 13 includes the main memory 104 and the non-volatile memory 106 as memory means.

The main memory 104 is a volatile storage area (RAM) and holds various programs to be executed by the microprocessor 100 after power is supplied to the CPU unit 13. In addition, the main memory 104 is used as a work memory during execution of various programs by the microprocessor 100. A device such as a DRAM (Dynamic Random Access Memory) or SRAM (Static Random Access Memory) is used as the main memory 104 of this kind.

Meanwhile, the non-volatile memory 106 holds, in a non-volatile manner, data such as a realtime OS (Operating System), a PLC 1 system program, a user program, a motion calculation program, and system setting parameters. These programs and data are copied to the main memory 104 as needed to enable the microprocessor 100 to access them. A semiconductor memory, such as a flash memory, can be used as the non-volatile memory 106 of this kind. Alternatively, a magnetic recording medium such as a hard disk drive or an optical recording medium such as a DVD-RAM (Digital Versatile Disk Random Access Memory) or the like can be used.

The system timer 108 generates an interrupt signal at each fixed cycle and provides the interrupt signal to the microprocessor 100. Typical configurations generate the interrupt signals on a plurality of different cycles according to hardware specifications. However, the interrupt signal can also be set to generate on a desired cycle according to an OS (Operating System), BIOS (Basic Input Output System), or the like. Using the interrupt signal generated by the system timer 108, a control operation is achieved for each control cycle (described below).

The CPU unit 13 includes the PLC system bus controller 120 and the field network controller 140 as communication circuits. These communication circuits transmit output data such as motion instruction value data and receive input data such as input data for motion control.

Moreover, in the case where the CPU unit 13 is allocated the functions of the I/O unit 14 and the servo motor driver 3, transmission of output data and reception of input data by the communication circuits treat the component serving those functions as a recipient of the communication, and so transmission and reception are performed within the CPU unit 13.

The PLC system bus controller 120 controls the exchange of data via the PLC system bus 11. More specifically, the PLC system bus controller 120 includes a DMA (Dynamic Memory Access) control circuit 122, a PLC system bus communication control circuit 124, and a buffer memory 126. Moreover, the PLC system bus controller 120 is internally connected to the PLC system bus 11 via a PLC system bus connector 130.

The buffer memory 126 serves as a transmission buffer for data output to another unit through the PLC system bus 11 (hereinafter also referred to as "output data") and a reception buffer for data input from another unit through the PLC system bus 11 (hereinafter also referred to as "input data"). The output data generated in calculation processing by the microprocessor 100 are originally stored in the main memory 104. Then, the output data to be transferred to a specific unit is retrieved from the main memory 104, and initially held in the buffer memory 126. The input data transferred from the other unit are initially held in the buffer memory 126, and then transferred to the main memory 104.

The DMA control circuit 122 transfers the output data from the main memory 104 to the buffer memory 126 and transfers the input data from the buffer memory 126 to the main memory 104.

The PLC system bus control circuit 124 transmits the output data from the buffer memory 126 to the other unit connected to the PLC system bus 11, and receives and stores in the buffer memory 126 the input data from the other unit connected to the PLC system bus 11. Typically, the PLC system bus control circuit 124 serves as a physical layer and a data link layer in the PLC system bus 11.

The field network controller 140 controls the exchange of data via the field network 2. In other words, the field network controller 140 controls the transmission of the output data and the reception of the input data according to specifications of the field network 2 being used. As noted above, in the present embodiments, the field network 2 following the EtherCAT® standard is used. Therefore, the field network controller 140 is used that includes hardware for performing ordinary Ethernet® communication. In the EtherCAT® standard, a universal Ethernet® controller can be used in which a communication protocol obeying the ordinary Ethernet® standard is attained. However, depending on what kind of industrial Ethernet® is used as the field network 2, an Ethernet® controller is used which has particular specifications corresponding to a communication protocol having an exclusive-use specification different from the ordinary communication protocol. In addition, when a field network other than an industrial Ethernet® is used, an exclusive-use field network controller corresponding to the specification is used.

A buffer memory 146 serves as a transmission buffer for data output to the other unit through the field network 2 (hereinafter referred also to as "output data") and a reception buffer for data input from the other unit through the field network 2 (hereinafter referred also to as "input data"). As described above, the output data generated in calculation processing by the microprocessor 100 is originally stored in the main memory 104. Then, the output data to be transferred to a specific unit is retrieved from the main memory 104, and initially held in the buffer memory 146. The input data transferred from the other units is initially held in the buffer memory 146, and then transferred to the main memory 104.

A DMA control circuit 142 transfers the output data from the main memory 104 to the buffer memory 146 and transfers the input data from the buffer memory 146 to the main memory 104.

A field network circuit 144 transmits the output data from the buffer memory 146 to the other units connected to the field network 2, and receives and stores in the buffer memory 146 the input data from the other units connected to the field network 2. Typically, the field network circuit 144 serves as a physical layer and a data link layer in the field network 2.

The USB connector 110 is an interface for connecting the PLC support device 8 and the CPU unit 13. Typically, programs and the like transferred from the PLC support device 8 and executable by the microprocessor 100 of the CPU unit 13 are taken into the PLC 1 via the USB connector 110.

<C. Software Configuration of CPU Unit>

Figure 3:
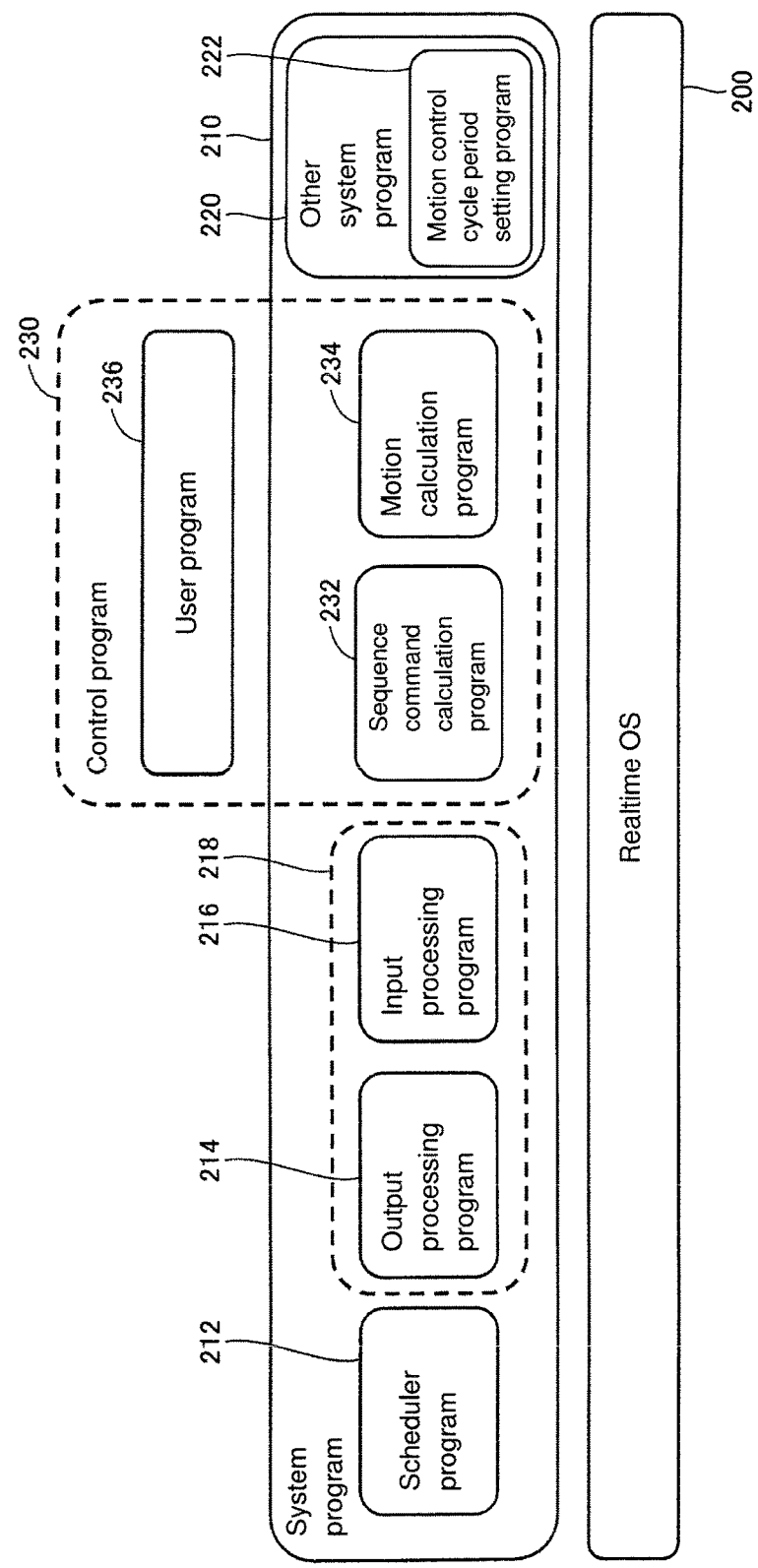
FIG. 3 A schematic view illustrating a configuration of software executed by the CPU unit according to the embodiments of the present invention.

Next, with reference to FIG. 3, a description is given of a software suite for providing various functions according to the present embodiments. A command included in the software is retrieved at an appropriate time and is executed by the microprocessor 100 of the CPU unit 13.

FIG. 3 is a schematic view illustrating a software configuration executed by the CPU unit 13 according to embodiments of the present invention. With reference to FIG. 3, the software executed by the CPU unit 13 has three layers: a realtime OS 200, a system program 210, and a user program 236.

The realtime OS 200 is designed according to the computer architecture of the CPU unit 13 and provides a basic executable environment for the microprocessor 100 to execute the system program 210 and the user program 236. The realtime OS is typically provided by the PLC manufacturer, a dedicated software company, or the like.

The system program 210 is a software suite for providing functions of the PLC 1. Specifically, the system program 210 includes a scheduler program 212, an output processing program 214, an input processing program 216, a sequence command calculation program 232, a motion calculation program 234, and other system programs 220. Moreover, in general, the output processing program 214 and the input processing program 216 are executed consecutively (as a unit), and thus these programs may be collectively referred to as an I/O processing program 218.

The user program 236 is created according to a control objective of a user. In other words, the user program 236 is a program designed as desired in response to a line (process) or the like to be controlled using the PLC system SYS.

As noted below, the user program 236 works together with the sequence command calculation program 232 and the motion calculation program 234 to achieve the control objective of the user. In other words, the user program 236 utilizes a command, mathematical function, functional module, or the like provided by the sequence command calculation program 232 and the motion calculation program 234 in order to achieve a programmed operation. Therefore, the user program 236, sequence command calculation program 232, and motion calculation program 234 may be collectively referred to as a control program 230.

In this way, the microprocessor 100 of the CPU unit 13 executes the system program 210 and the user program 236 stored in the memory means.

Hereafter, each program is described in detail.

As noted above, the user program 236 is created according to the control objective of the user (e.g., a line or process to be controlled). Typically, the user program 236 is in an object program format that can be executed by the microprocessor 100 of the CPU unit 13. The user program 236 is generated in the PLC support device 8 or the like by compiling a source program written in a ladder language or the like. In addition, the generated user program 236 in the object program format is transferred from the PLC support device 8 to the CPU unit 13 via the connection cable 10, and is then stored in the non-volatile memory 106 or the like.

The scheduler program 212 controls process initiation in each execution cycle and process restart after the process is interrupted for the output processing program 214, the input processing program 216, and the control program 230. More specifically, the scheduler program 212 controls execution of the user program 236 and the motion calculation program 234.

In the CPU unit 13 according to the present embodiments, the fixed-cycle execution cycle (motion control cycle) suitable for the motion calculation program 234 is used as a shared cycle of an entire process. Therefore, because all processes are unlikely to be completed within one motion control cycle, the processes are sorted according to a degree of priority of the processes to be executed into processes for which execution must be completed in each motion control cycle and processes which may be executed over a plurality of motion control cycles. The scheduler program 212 administrates an execution sequence and the like of the sorted processes. More specifically, the higher the degree of priority given the program, the sooner the scheduler program 212 executes the program within each control cycle duration.

The output processing program 214 reallocates the output data generated by execution of the user program 236 (the control program 230) in a format appropriate for transfer to the PLC system bus controller 120 and/or the field network controller 140. When the PLC system bus controller 120 or the field network controller 140 requires an instruction from the microprocessor 100 for executing a transmission, the output processing program 214 issues the instruction.

The input processing program 216 reallocates the input data received by the PLC system bus controller 120 and/or the field network controller 140 in a format appropriate for use by the control program 230.

The sequence command calculation program 232 is a program called up when a given sequence command used by the user program 236 is executed. The sequence command calculation program 232 is executed to attain the content of the command.

The motion calculation program 234, which is executed according to an instruction from the user program 236, calculates an instruction value output to a motor driver, such as the servo motor driver 3 or pulse motor driver.

The other system programs 220 refer to a group of programs to achieve various functions of the PLC 1 other than the programs individually indicated in FIG. 3. The other system programs 220 include a motion control cycle period setting program 222.

A period of a motion control cycle can be set as desired, depending on a purpose of control. Typically, a user enters data specifying a period of a motion control cycle in the PLC support device 8. Then, the entered data is transferred from the PLC support device 8 to the CPU unit 13. The motion control cycle period setting program 222 stores the data from the PLC support device 8 in the non-volatile memory 106, and sets the system timer 108 such that an interrupt signal is generated from the system timer 108 for every specified period of the motion control cycle. When power is supplied to the CPU unit 13, the motion control cycle period setting program 222 is executed. Then, the data specifying the period of the motion control cycle is retrieved from the non-volatile memory 106 and the system timer 108 is set based on the retrieved data.

A format of the data specifying the period of the motion control cycle can be a time value indicating the period of the motion control cycle or data (number or character) specifying one from a plurality of options prepared in advance for the period of the motion control cycle.

In the CPU unit 13 according to the present embodiments, means to set the period of the motion control cycle refer to elements used to set a desired period of the motion control cycle, including a communication means with the PLC support device 8 used to receive data specifying the period of the motion control cycle, the motion control cycle period setting program 222, and the system timer 108 configured to set a desired period of an interrupt signal that defines the motion control cycle.

The realtime OS 200 provides an environment to switch among and execute a plurality of programs as time elapses. As an event (interrupt) to output (transmit) to other units or other devices output data generated by program execution by the CPU unit 13, an output preparation interrupt (P) and a field network transmission interrupt (X) are initially set in the PLC 1 according to the present embodiments. When the output preparation interrupt (P) or the field network transmission interrupt (X) is generated, the realtime OS 200 switches a program executed by the microprocessor 100 from a program being executed at the time of interruption to the scheduler program 212. When neither the scheduler program 212 nor a program whose execution is controlled by the scheduler program 212 is being executed, the realtime OS 200 executes another program included in the system program 210. Examples of such a program include communication processing through the connection cable 10 (USB) between the CPU unit 13 and the PLC support device 8.

<D. Main Memory Configuration>

A memory area configured in the main memory 104 of the CPU unit 13 is described below with reference to FIG. 4.

Figure 4:
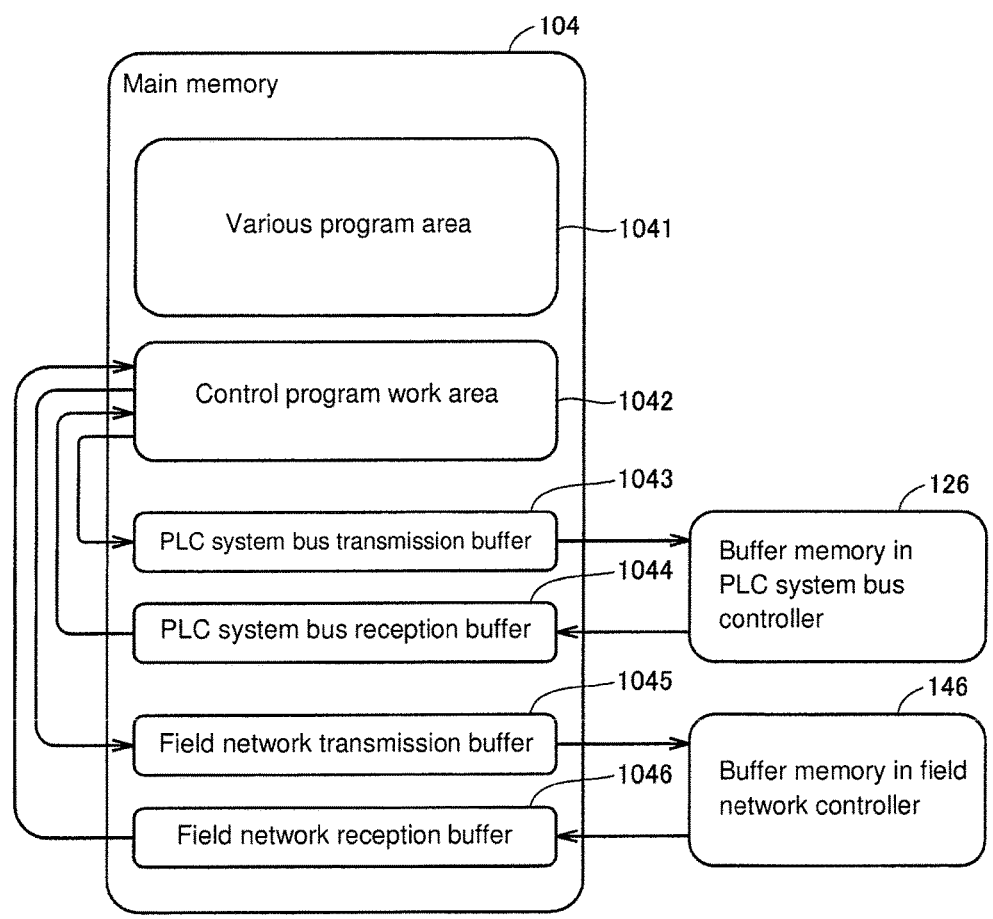
FIG. 4 A schematic view illustrating a main memory area configuration in the CPU unit according to the embodiments of the present invention.

FIG. 4 is a schematic view illustrating an area configuration of the main memory 104 in the CPU unit 13 according to the embodiments of the present invention. With reference to FIG. 4, the main memory 104 includes a various program area 1041, a control program work area 1042, a PLC system bus transmission buffer 1043, a PLC system bus reception buffer 1044, a field network transmission buffer 1045, and a field network reception buffer 1046.

The various program area 1041 temporarily stores codes to execute various programs.

The control program work area 1042 temporarily stores output data generated in execution of the control program 230.

The PLC system bus transmission buffer 1043 and the PLC system bus reception buffer 1044 temporarily store data transmitted and received, respectively, through the PLC system bus 11. Similarly, the field network transmission buffer 1045 and the field network reception buffer 1046 temporarily store data transmitted and received, respectively, through the field network 2.

More specifically, when any output data are to be transmitted through the PLC system bus 11, the output processing program 214 copies the output data to be transmitted from the control program work area 1042 to the PLC system bus transmission buffer 1043. In this process, the output processing program 214 reallocates the output data in the PLC system bus transmission buffer 1043 such that an output data group for an identical unit is bundled for collective transmission of a plurality of output data transmitted to the identical unit.

Similarly, when any output data are to be transmitted through the field network 2, the output processing program 214 copies the output data to be transmitted from the control program work area 1042 to the field network transmission buffer 1045. In this process, the output processing program 214 reallocates the output data in a format for serial frame transmission in the field network transmission buffer 1045.

The input processing program 216 copies to the control program work area 1042 the input data received by the PLC system bus controller 120 and stored in the PLC system bus reception buffer 1044 and/or the input data received by the field network controller 140 and stored in the field network reception buffer 1046. In this process, the input processing program 216 reallocates the input data in a format suitable for use by the control program 230 in the control program work area 1042.

The DMA control circuit 122 of the PLC system bus controller 120 transfers the output data stored in the PLC system bus transmission buffer 1043 to the buffer memory 146 of the PLC system bus controller 120, and transfers the input data stored in the buffer memory 146 to the PLC system bus reception buffer 1044.

The DMA control circuit 142 of the field network controller 140 transfers the output data stored in the field network transmission buffer 1045 to the buffer memory 146 of the field network controller 140, and transfers the input data stored in the buffer memory 146 to the field network reception buffer 1046.

The control program work area 1042, the PLC system bus transmission buffer 1043, the PLC system bus reception buffer 1044, the field network transmission buffer 1045, and the field network reception buffer 1046 are configured to control access to one another independently. Thus, a plurality of operations (1) to (3) described below can be executed in parallel.

(1) Access to the control program work area 1042 by the microprocessor 100 in association with execution of the user program 236.

(2) Access to the PLC system bus transmission buffer 1043 and/or the PLC system bus reception buffer 1044 in the main memory 104 by the DMA control circuit 122 of the PLC system bus controller 120 for data transfer between the PLC system bus transmission buffer 1043 and/or the PLC system bus reception buffer 1044 in the main memory 104 and the buffer memory 126 in the PLC system bus controller 120.

(3) Access to the field network transmission buffer 1045 and/or the field network reception buffer 1046 in the main memory 104 by the DMA control circuit 142 of the field network controller 140 for data transfer between the field network transmission buffer 1045 and/or the field network reception buffer 1046 in the main memory 104 and the buffer memory 146 in the field network controller 140.

<E. Application>

Some application examples are described below in which the PLC system SYS according to the present embodiments is applied.

First, an exemplary configuration included in the above-described user program 236 is described. The user program 236 includes a command to periodically determine whether a condition is met for starting control of motion of the motor. An example is a logic in which it is determined whether a work piece to be handled is transferred by drive power of a motor to a predetermined handling position. The user program 236 further includes a command to start motion control in response to a determination that the condition for starting control has been met. With the start of the motion control, execution of a motion command is instructed. Then, the motion calculation program 234 corresponding to the instructed motion command starts. First, initial processing is executed which is required to calculate an instruction value to the motor for each execution of the motion calculation program 234. In a motion control cycle identical to the initial processing, an instruction value in a first cycle is calculated. Thus, the initial processing and calculation processing of the first instruction value are to be executed first by the motion calculation program 234 after being started. Thereafter, an instruction value in each cycle is sequentially calculated.

Figure 5:
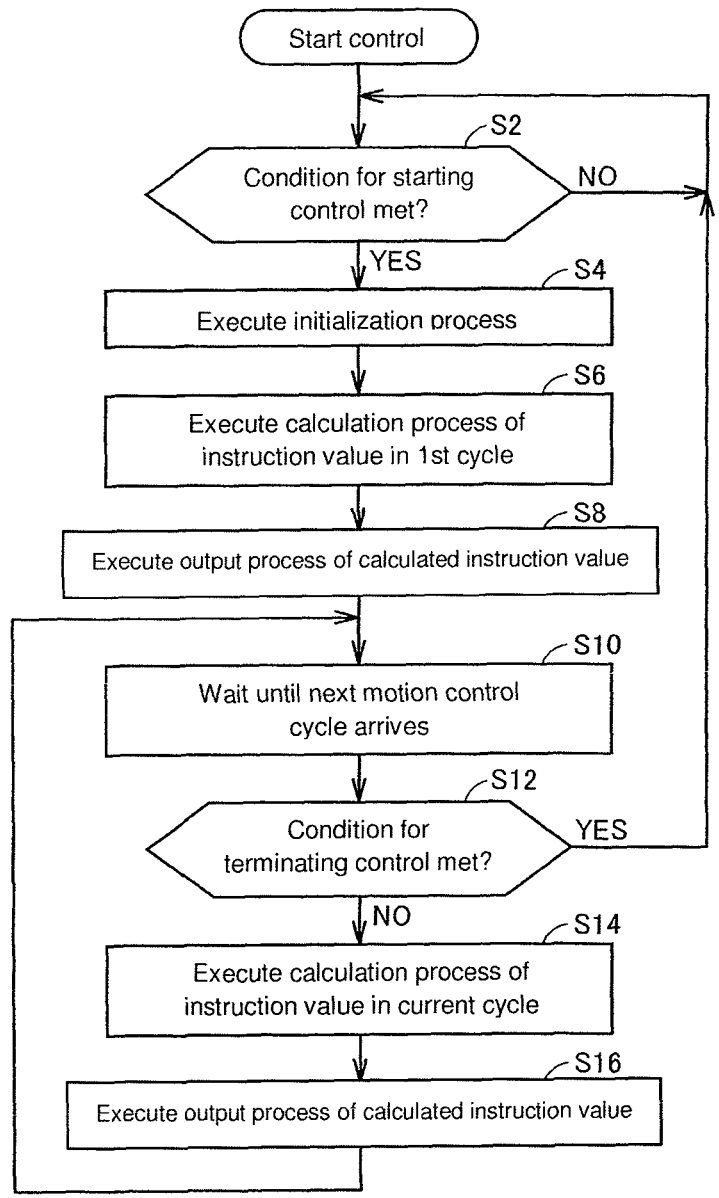
FIG. 5 A flowchart illustrating a schematic processing procedure of motion control provided by control programs (user program, sequence command calculation program, and motion calculation program) according to the embodiments of the present invention.

FIG. 5 is a flowchart illustrating a schematic processing procedure of motion control provided by the control programs 230 (user program 236, sequence command calculation program 232, and motion calculation program 234) according to the embodiments of the present invention. With reference to FIG. 5, the microprocessor 100 periodically determines whether a condition is met for starting control of motion of the motor (Step S2). The determination whether the condition for starting control is met is performed by the user program 236 and the sequence command calculation program 232. When the condition for starting control is not met (NO in Step S2), the determination of Step S2 is repeated.

When the condition for starting control has been met (YES in Step S2), the microprocessor 100 executes initial processing for motion control (Step S4). The initial processing includes calculation processing of a start position coordinate, an end position coordinate, initial speed, initial acceleration, trajectory, and the like of motion of the motor. Then, the microprocessor 100 executes calculation processing of an instruction value in a first cycle (Step S6). The microprocessor 100 also executes output processing of the calculated instruction value (Step S8).

Thereafter, the microprocessor 100 waits until the next motion control cycle comes (Step S10). Then, the microprocessor 100 periodically determines whether the condition is met for ending control of motion of the motor (Step S12). That the condition for ending control is met includes a state where the servo motor 4 has reached an end position. When the condition for ending control has been met (YES in Step S12), processes of Step S2 and thereafter are repeated again. During these processes, the started motion calculation program 234 remains in an inactive state until a condition for starting new control is met.

When the condition for ending control is not met (NO in Step S12), the microprocessor 100 executes calculation processing of an instruction value in the current cycle (Step S14). The microprocessor 100 also executes output processing of the calculated instruction value (Step S16). Then, processes of Step S10 and thereafter are repeated.

Some examples are described below where a user needs special motion control.

e1: Application Example 1

Figure 6:
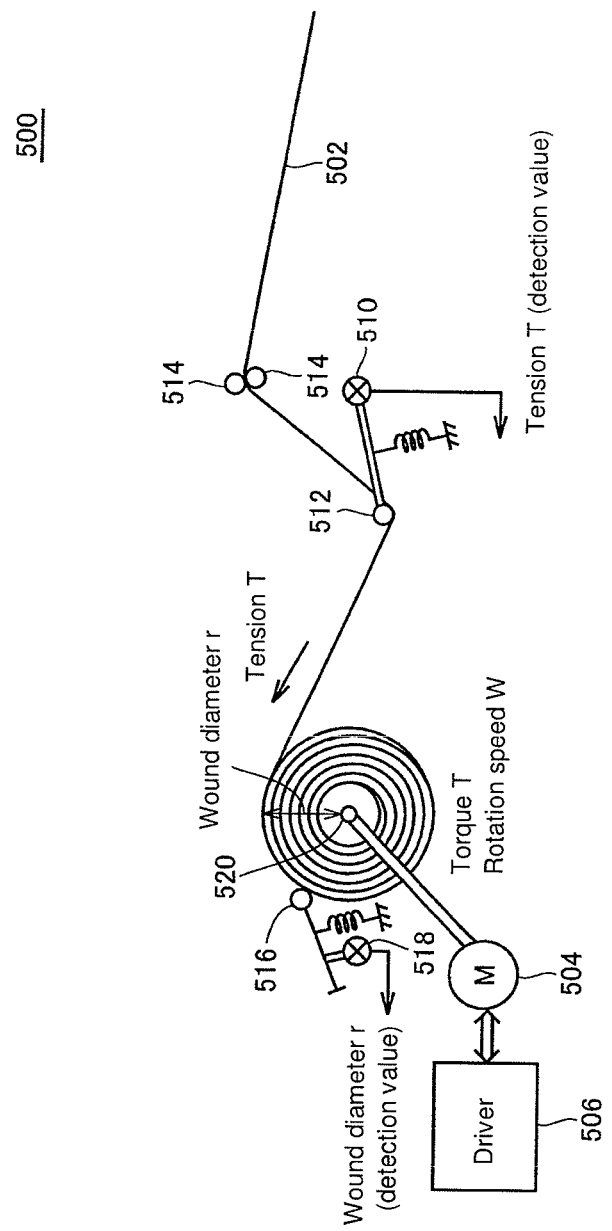
FIG. 6 A schematic view illustrating Application Example 1 of the CPU unit according to the embodiments of the present invention.

FIG. 6 is a schematic view illustrating Application Example 1 of the CPU unit 13 according to the embodiments of the present invention. With reference to FIG. 6, a winding device 500 winding a long sheet material 502 around a roller 520 is assumed as Application Example 1. The winding device 500 winds the sheet material 502 around the roller 520 while maintaining tension applied to the sheet material 502 at a constant level. More specifically, a tension roller 514 provided on a feeding side of the sheet material 502 is used to apply a relatively small braking force (frictional force) to the sheet material 502 and to adjust drive torque τ or rotation speed ω of the roller 520. Thereby, the tension of the sheet material 502 is controlled to a target value.

In the winding device 500, a wound diameter r of the roller 520 gradually increases as the sheet material 502 is wound around. The roller 520, meanwhile, is rotated and driven by a motor 504 mechanically connected to a rotation axis of the roller 520. Tension T in an outermost peripheral surface (position of the wound diameter r) of the roller 520 should be controlled in principle. A controllable physical amount, however, is the torque τ or rotation speed ω of the motor 504. A relationship between the torque τ or rotation speed ω and the tension T varies depending on the wound diameter r of the roller 520. More specifically, as the wound diameter r of the roller 520 increases, the tension T varies only slightly even when a torque instruction value is changed largely, while the tension T varies largely even when a rotation speed instruction value is changed only slightly.

Thus, the torque or rotation speed of the motor 504 (specifically, a torque instruction value or rotational speed instruction value provided to a driver 506 that drives the motor 504) needs to be changed depending on the wound diameter of the roller 520.

The winding device 500 detects the tension T generated in the sheet material 502 and calculates a torque instruction value or rotational speed instruction value such that a detected value of the tension T is identical to a target value. In an exemplary mechanism for detecting the tension T, a roller for tension detection 512 urged by a spring is provided. The roller for tension detection 512 is pressed against the sheet material 502 moving in the air, and then the sheet material 502 slightly yields. When pressing force of the roller for tension detection 512 (force with which the spring pulls the roller for tension detection 512 downward) comes into balance with repulsion force due to the tension of the sheet material 502 (force that pushes the roller for tension detection 512 upward), the roller for tension detection 512 stops. A position of the roller for tension detection 512, which varies depending on the tension of the sheet material 502, is detected by a position sensor (rotary encoder) 510. The detected position of the roller for tension detection 512 is input to the PLC 1. A value of the position of the roller for tension detection 512 is associated with a level of the tension T of the sheet material 502.

The microprocessor 100 of the CPU unit 13 of the PLC executes the user program 236 to calculate the tension T of the sheet material 502 based on the position of the roller for tension detection 512 from input data of the detected position of the roller for tension detection 512 and the current torque value and speed value of the motor 504 that drives the roller 520. Furthermore, the microprocessor 100 performs calculation associated with a mechanical system of the winding device 500 to acquire a torque instruction value or speed instruction value necessary for the calculated tension T to approach the target value. The acquired torque instruction value or speed instruction value is transmitted to the motion calculation program 234 executed by the microprocessor 100.

For the calculation processing to acquire a torque instruction value or speed instruction value, a logic can be employed in which a relationship between an instruction value and tension is estimated from actual data that demonstrates how much the tension has varied depending on how much the instruction value (torque instruction value or speed instruction value) is changed in the recent past, and based on the estimated relationship, an instruction value (torque instruction value or speed instruction value) in the present cycle is calculated.

Alternatively, an instruction value (torque instruction value or speed instruction value) may be calculated from a detection result of detection of the wound diameter r of the roller 520 in each cycle. In an exemplary mechanism for detecting the wound diameter r, a roller for wound diameter detection 516 urged by a spring is provided. The roller for wound diameter detection 516 is pressed to the center of the roller 520. A position of the roller for wound diameter detection 516, which varies depending on the wound diameter of the roller 520, is detected by a position sensor 518.

The microprocessor 100 executes the motion calculation program 234 and the output processing program 214 associated therewith to output the instruction value (torque instruction value or speed instruction value) provided by the user program 236 to the driver 506 that drives the motor 504 through the field network 2.

In the application shown in FIG. 6, the user program 236 performs substantially the entire motion calculation, and the motion calculation program 234 manages output of the instruction value to the driver 506.

e2: Application Example 2

Figure 7:
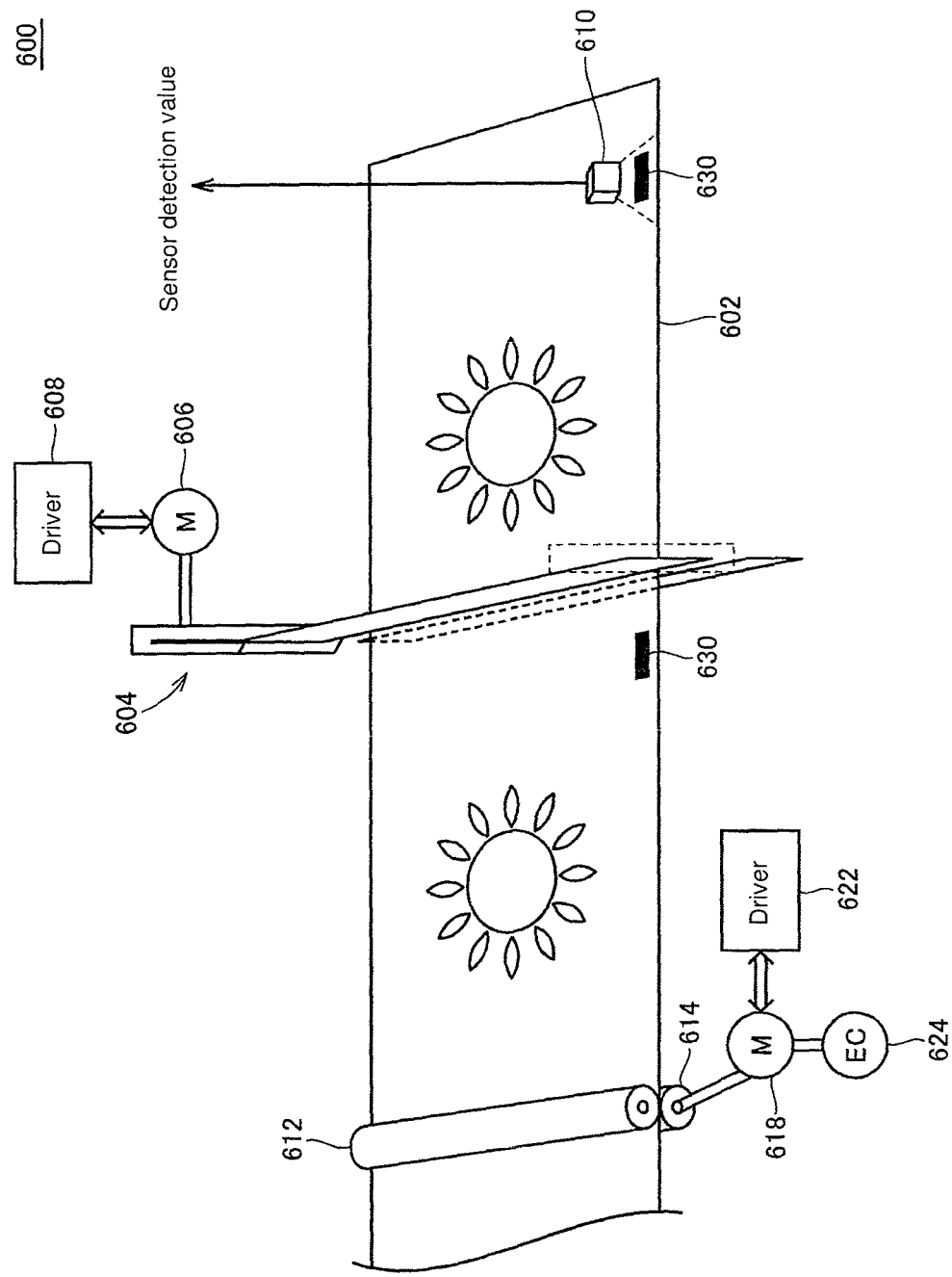
FIG. 7 A schematic view illustrating Application Example 2 of the CPU unit according to the embodiments of the present invention.

FIG. 7 is a schematic view illustrating Application Example 2 of the CPU unit 13 according to the embodiments of the present invention. With reference to FIG. 7, a cutting device 600 is assumed as Application Example 2, the cutting device 600 cutting a sheet material 602 at a position of an image break as the sheet material 602 on which a fixed image is repeatedly printed is being fed. In the cutting device 600, operation of a motor 606 is controlled to move a cutter 604 for cutting the sheet material 602. More specifically, operation of an electronic cam is controlled, the electronic cam moving up and down the cutter 604 in conjunction with rotation by a predetermined angle of rollers 612 and 614 that feed the sheet material 602.

For execution of the operation of the electronic cam, an initial phase needs to be determined to start cutting in line with the image on the sheet material 602. In addition, in view of expansion and contraction of the sheet material 602 due to a variation in tension and temperature, a phase and period of the cutting operation need to be adjusted so as to cut appropriately at an image break even when the sheet material 602 has shrunk or stretched.

In Application Example 2 shown in FIG. 7, a mark 630 is printed in association with a print position of the image on the sheet material 602. A detection sensor 610 (typically, an optical sensor) is provided above a feeding path of the sheet material 602. The sensor 610 detects passage of the mark 630.

The roller 614 feeding the sheet material 602 is rotated and driven by a mechanically connected motor 618. The motor 618 is driven by a motor driver 622. The motor 618 mechanically connected to the roller 614 has a rotary encoder 624 detecting a rotation angle (rotation position) of the roller 614. The rotation angle (rotation position) detected by the rotary encoder 624 is input to the PLC 1.

Each detection value of the rotation angle (rotation position) is held, the detection value being acquired by the rotary encoder 624 at a timing when the sensor 610 detects the passage of the mark 630. A difference is calculated between a detection value held last time and a detection value held this time, and then an interval to cut the sheet material 602 can be determined, the interval reflecting expansion or contraction of the sheet material 602 as well.

The microprocessor 100 of the CPU unit 13 of the PLC executes the user program 236 to calculate an initial phase of a cut timing indicated as the rotation angle (rotation position) of the roller 614 based on the input detection value by the rotary encoder 624 and detection value of the mark 630 by the sensor 610. Furthermore, the microprocessor 100 periodically calculates correction values for a phase and period in each cycle thereafter. The calculated correction values for the phase and period are transferred to the motion calculation program 234 executed by the microprocessor 100. The microprocessor 100 executes the motion calculation program 234 to control the operation of the motor 618 by reflecting the provided initial phase of the cut timing and the correction values for the phase and period. Specifically, execution of the motion calculation program 234 outputs to the motor driver 622 the initial phase of the cut timing and instruction values reflecting the correction values for the phase and period.

In order to identify a position of the image on the sheet material 602, a visual sensor having a camera may be used. In this case, the camera is positioned such that the image on the sheet material 602 is included in a view field of the camera. The visual sensor performs processing of matching an image captured by the camera with a model image showing a previously registered image, and then identifies a position of the image on the sheet material 602. Depending on the identified position of the image, a corresponding detection value is acquired by the rotary encoder 624.

e3: Application Example 3

Figure 8:
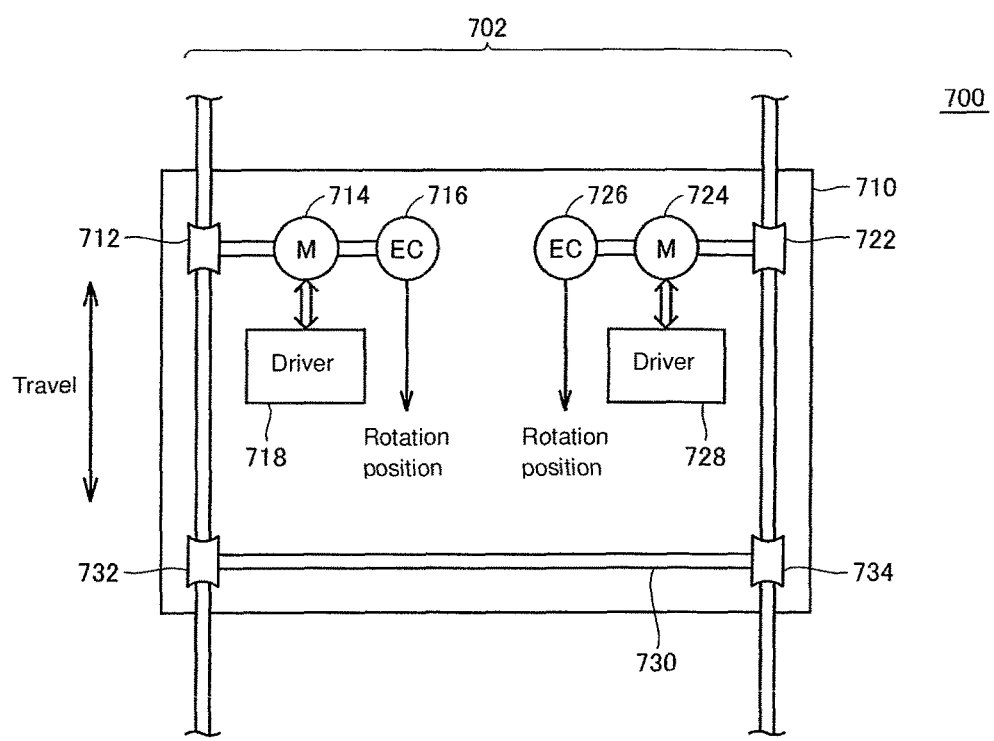
FIG. 8 A schematic view illustrating Application Example 3 of the CPU unit according to the embodiments of the present invention.

FIG. 8 is a schematic view illustrating Application Example 3 of the CPU unit 13 according to the embodiments of the present invention. With reference to FIG. 8, a carrier system 700 is assumed as Application Example 3, in which a carrier vehicle 710 moves on a linear rail 702. Left and right drive wheels 712 and 722 of the carrier vehicle 710 are driven by independent motors 714 and 724, respectively.

To travel on the linear rail 702, the PLC 1 can just provide an instruction value of a rotation position identical to left and right to the drivers 718 and 728 in each motion control cycle since a rotation amount is ideally the same for the left and right drive wheels 712 and 722. There may be a case, however, where only one drive wheel spins free depending on an unbalanced load on the carrier vehicle 710, a condition of the rail 702, or the like.

For example, when only the right drive wheel 722 temporarily slips and spins free, an instruction value of the rotation position for the right drive wheel 722 thereafter needs to be corrected with a rotation amount of the free spin (an amount of free spin to be added). To support such an application, a motion command referred to as multi-axis composite positioning is provided. This motion command provides an instruction value of a rotation position for a sub-axis (for example, right drive wheel 722), the rotation position being calculated by adding a value of an auxiliary axis to an original instruction value of a rotation position for a main axis (for example, left drive wheel 712).

The microprocessor 100 executes the user program 236 to acquire rotation positions of the left and right drive wheels 712 and 722 (outputs from the rotary encoders 716 and 726 provided to the left and right drive wheels 712 and 722, respectively) for every constant period. The microprocessor 100 then determines whether a difference between the rotation positions of the left and right drive wheels 712 and 722 exceeds a predetermined tolerance. When the difference between the rotation positions has exceeded the predetermined tolerance, the microprocessor 100 updates a value (position) for the auxiliary axis so as to fall within the tolerance. Then, the updated value (position) for the auxiliary axis is transmitted to the motion calculation program 234 executed by the microprocessor 100. The microprocessor 100 executes the motion calculation program 234 to calculate an instruction value for the main axis according to a separately specified motion command in each user program execution cycle, and to calculate an instruction value for the sub-axis by correcting the instruction value for the main axis, using the provided updated value (position) for the auxiliary axis. The calculated instruction values are output to the drivers 718 and 728.

<F. Overall Processing Operations (Embodiment 1)>

An execution sequence of each program according to the present embodiments is described below. In the present specification, Embodiments 1 to 4 are presented as examples that embody the technical concept of the present invention.

f1: Present Embodiment

Figure 9:
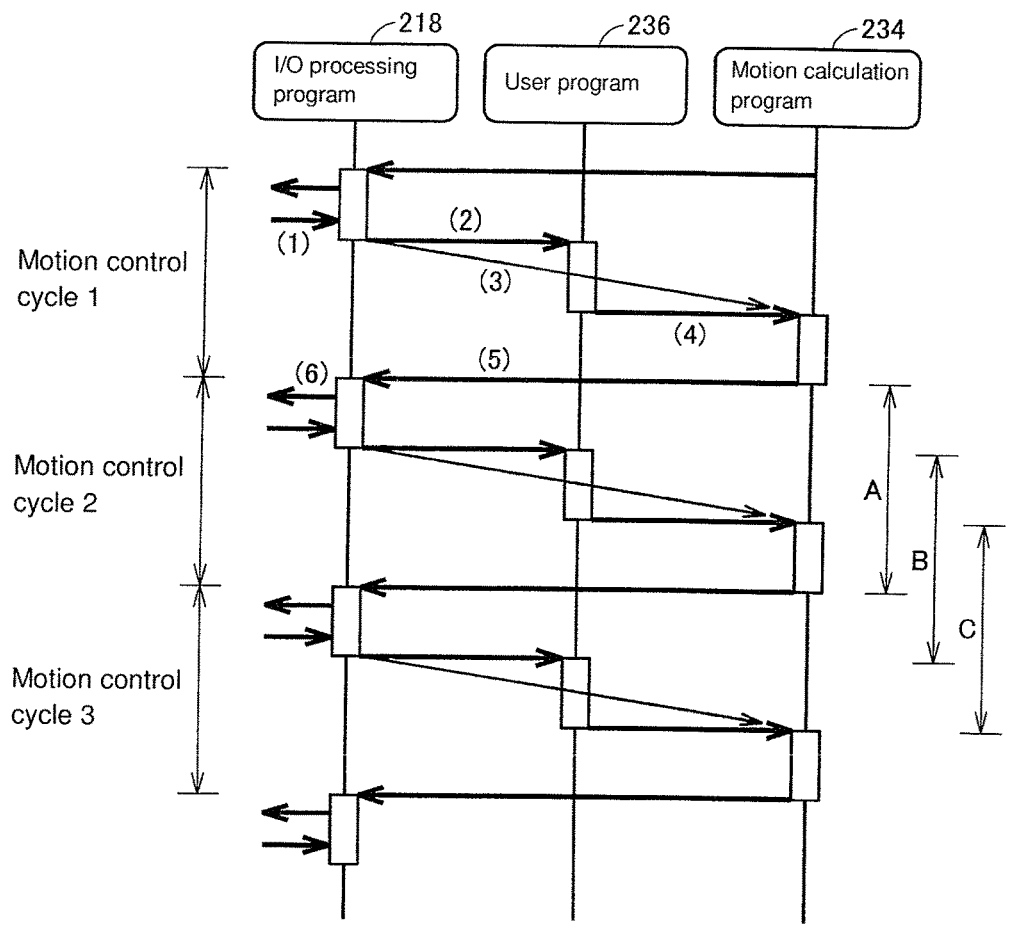
FIG. 9 A sequence diagram illustrating overall processing operations according to Embodiment 1 of the present invention.

FIG. 9 is a sequence diagram illustrating overall processing operations according to Embodiment 1 of the present invention. With reference to FIG. 9, during execution of the PLC 1 according to the present embodiment, the microprocessor 100 is ready to execute at least the I/O processing program 218 (output processing program 214/input processing program 216), the user program 236 (first user program), and the motion calculation program 234. Technically speaking, the realtime OS 200 holds processes (or threads) associated with each program so as to be executed. The scheduler program 212 uses the realtime OS 200 and a hardware resource (system timer 108 or the like) to execute the programs in an appropriate sequence at an appropriate timing. Thus, the scheduler program 212 controls start, interrupt, and end of execution of each program; however, FIG. 9 does not include processes associated with the scheduler program 212.

With reference to FIG. 9, the sequence below proceeds during execution of the PLC 1.

(1) The field network controller 140 receives input data for motion control and stores the input data in the field network reception buffer 1046 (FIG. 4), and/or the PLC system bus controller 120 receives input data for motion control and stores the input data in the PLC system bus reception buffer 1044 (FIG. 4).

(2) According to a command from the I/O processing program 218, the input data for motion control stored in the field network reception buffer 1046 and/or the PLC system bus reception buffer 1044 is transferred to a work area associated with the user program 236 (typically, a portion of the control program work area 1042 (FIG. 4)). Thus, the user program 236 can access the input data for motion control when executed by the microprocessor 100.

(3) According to a command from the I/O processing program 218, the input data for motion control stored in the field network reception buffer 1046 and/or the PLC system bus reception buffer 1044 is transferred to a work area associated with the motion calculation program 234 (typically, a portion of the control program work area 1042 (FIG. 4)). Thus, the motion calculation program 234 can access the input data for motion control when executed by the microprocessor 100.

(4) According to a command from the user program 236, output data of the user program 236 is calculated using the input data for motion control, and the calculated output data is transferred to the work area associated with the motion calculation program 234 (typically, a portion of the control program work area 1042 (FIG. 4)). Thus, the motion calculation program 234 can access the output data from the user program 236 when executed by the microprocessor 100.

(5) According to a command from the motion calculation program 234, a motion instruction value is calculated using necessary data from the input data for motion control and the output data from the user program, and the calculated motion instruction value data is transferred to a work area associated with the I/O processing program 218 (typically, a portion of the control program work area 1042 (FIG. 4)). Thus, the I/O processing program 218 can access the motion instruction value data calculated by the motion calculation program 234 when executed by the microprocessor 100.

(6) According to a command from the I/O processing program 218, the motion instruction value data is output. More specifically, the motion instruction value data stored in the control program work area 1042 (FIG. 4) is transferred to the field network transmission buffer 1045 (FIG. 4). Subsequent to the data transfer to the field network transmission buffer 1045, the field network controller 140 transmits the motion instruction value data to the servo motor driver 3.

In process (1) above, the input data used for calculation in the user program 236, but not used for calculation in the motion calculation program 234 may also be input. The output data from the user program generated by execution of the user program 236, including the output data not used for calculation by the motion calculation program 234, is transmitted to the I/O processing program 218 and output in process (6).

The "motion control cycle" according to the present embodiment is a cycle of a series of processes executed in a period of execution and communication of the motion calculation program 234, specifically, a period in which the motion instruction value data is provided to the servo motor driver 3. As shown in FIG. 9, a range of one motion control cycle (from start to end) may be determined based on any one of A, B, and C indicated on the right-hand side in FIG. 9. Specifically, the motion control cycle is not defined by a start timing and/or end timing of a specific program, but simply is a cycle of processing including one execution of the motion calculation program 234. An example is provided on the left-hand side in FIG. 9, where motion control cycles 1 to 3 (three cycles) are divided based on A on the right-hand side in FIG. 9.

With reference to FIG. 9, regardless whether the motion control cycle is divided based on A, B, or C, the scheduler program 212 includes a command to cause the microprocessor 100 to start execution of the motion calculation program 234 in each motion control cycle and a command to cause the microprocessor 100 to start execution of the user program 236 (first user program) in each user program execution cycle (identical to the motion control cycle in this example). Furthermore, the scheduler program 212 includes a command to repeat the I/O processing (output processing and input processing), start of execution of the user program 236, end of execution of the user program 236, and start of execution of the motion calculation program 234 in this sequence for every period corresponding to a period of the user program execution cycle. However, cycle phases (cycle start timings) do not necessarily coincide between the cycle of the series of processes by the command and the user program execution cycle.

In the I/O processing shown in FIG. 9, the output processing is executed first according to the command from the output processing program 214, and then the input processing is executed according to the command from the input processing program 216. However, the output processing and the input processing may be executed in the reverse order, and if possible, may be executed in parallel.

With reference to FIG. 9, the CPU unit 13 of the PLC 1 is configured to be able to repeat the output processing of the motion instruction value data and the input processing of the input data for motion control (I/O processing), and the execution of the motion calculation program 234 for every motion control cycle having a constant period. Furthermore, the CPU unit 13 of the PLC 1 is configured to be able to repeat the user program 236 for every user program execution cycle having a period of integral multiple of the period of the motion control cycle, the user program 236 being created depending on a purpose of control of a user and including processing of providing to the motion calculation program 234 an instruction required for execution thereof.

The communication circuits included in the CPU unit 13 (PLC system bus controller 120 and field network controller 140) transmit the motion instruction value data as at least a portion of the output processing and receive the input data for motion control as at least a portion of the input processing in each motion control cycle.

According to the present embodiment, a time required from the start of the input processing (process (1) in FIG. 9) to the output processing of the motion instruction value data reflecting the input data for motion control input in the input processing (process (6) in FIG. 9) can be further reduced and correspond to the period of the user program execution cycle.

In the example shown in FIG. 9, the period of the user program execution cycle is equal to the period of the motion control cycle. Separately setting the periods allows calculation of motion instruction value data by using updated user program output data in each execution of the motion calculation program 234. Specifically, updated motion instruction value data can be output in each output processing.

In the example shown in FIG. 9, when the motion control cycle is divided based on A, the scheduler program 212 includes a command to cause the microprocessor 100 to execute the user program 236 and the motion calculation program 234 in this sequence after the output processing and the input processing (I/O processing) in the motion control cycle. In this case, the output processing and the input processing (I/O processing) associated with motion control can be performed, preceding the execution of the user program 236 and the motion calculation program 234 in the motion control cycle, and thus a variation in an input and output communication cycle can be reduced. Accordingly, motion of a motor can be controlled more precisely.

f2: Comparative Example

To describe effects of the scheduler program 212 of the present embodiment, a comparative example is described below in which a sequence of program execution is different from the sequence shown in FIG. 9.

Figure 10:
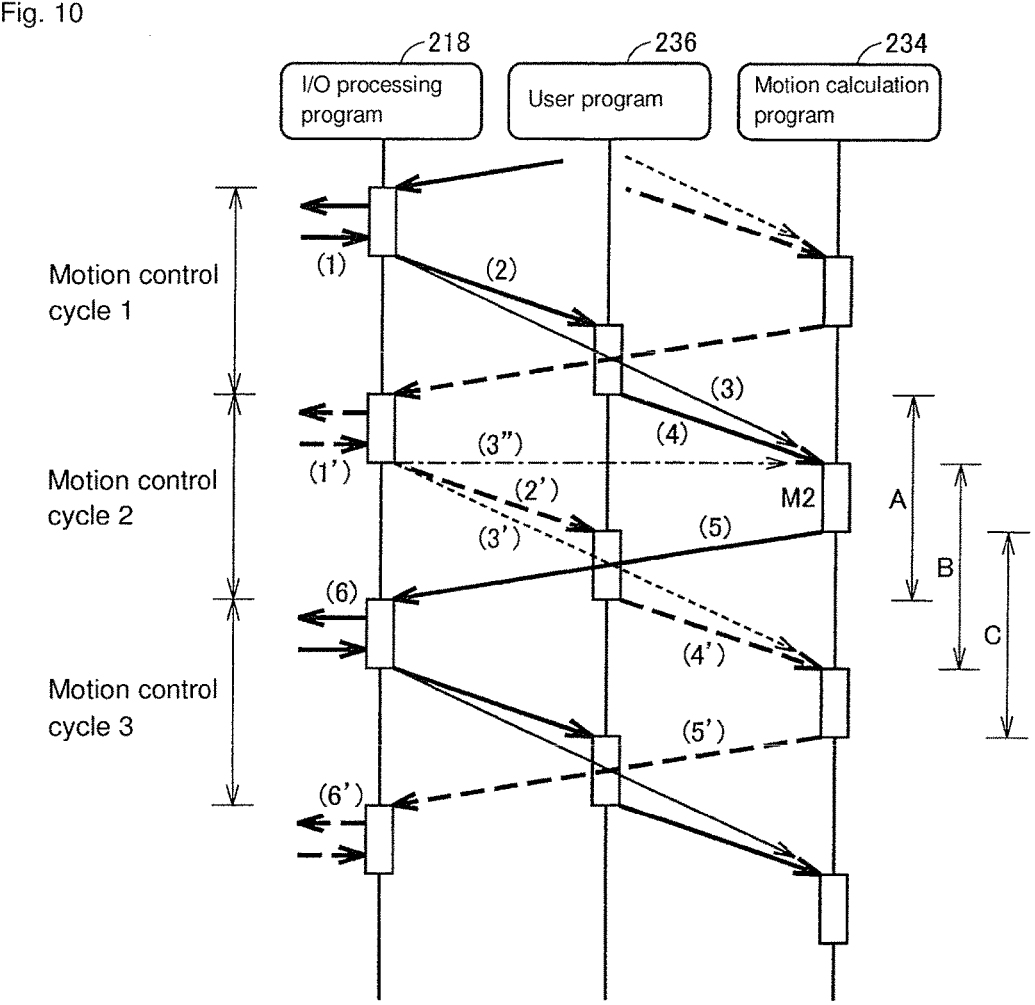
FIG. 10 A sequence diagram illustrating overall processing operations in a comparative example associated with the overall processing operations illustrated in FIG. 9.

FIG. 10 is a sequence diagram illustrating overall processing operations in the comparative example associated with the overall processing operations illustrated in FIG. 9. In the example in FIG. 9 above, the programs are executed in the sequence of the "I/O processing program 218," "user program 236," and "motion calculation program 234." In the comparative example in FIG. 10, the programs are executed in the sequence of the "I/O processing program 218," "motion calculation program 234," and "user program 236."

In the case of the sequence of program execution in the comparative example shown in FIG. 10, a time equivalent to two periods of an execution cycle of the user program 236 is required from start of input processing (process (1) in FIG. 10) to output processing of motion instruction value data reflecting input data for motion control input in the input processing (process (6') in FIG. 10). As a result, compared to the sequence of program execution shown in FIG. 9, control is delayed for a time of one period of the user program execution cycle.

More specifically, descriptions of processes (1) to (6) in the comparative example shown in FIG. 10 are identical to processes (1) to (6) in FIG. 9. Descriptions of processes (1') to (6') in FIG. 10 are identical to processes (1) to (6) in FIG. 9. In the sequence shown in FIG. 10, the time to perform processes (1) to (6) is longer than the period of the user program execution cycle by one period of a motion control cycle. Moreover, processes (1') to (6') start during processes (1) to (6).

Since processes (1) to (6) and processes (1') to (6') are performed in parallel in the sequence shown in FIG. 10, a problem arises where handling of the input data for motion control becomes complicated during execution of the motion calculation program 234 (M2) in a motion control cycle 2. For example, during the execution of the motion calculation program 234 (M2) in the motion control cycle 2, the input processing of new input data for motion control (process (1') in FIG. 10) is completed before the execution of the motion calculation program 234 (M2). Thus, during the execution of the motion calculation program 234 (M2), in addition to the input data for motion control intended to be used (input data transferred from process (3) in FIG. 10), the new input data for motion control not intended to be used (input data transferred from process (3") in FIG. 10) are held in the work area. Thus, a management mechanism is required such that the input data intended to be used are used and the new input data are not used during the execution of the motion calculation program 234 (M2). This complicates the processing.

Accordingly, executing the programs in the execution sequence according to the present embodiment shown in FIG. 9 prevents the problem that arises in the sequence of FIG. 10 and increases speed of a control period.

<G. Overall Processing Operations (Embodiment 2)>

In Embodiment 1 above, the description is provided focusing on the execution sequence of the "I/O processing program 218," "user program 236," and "motion calculation program 234." Even when all the programs are executed in one motion control cycle, there is a case where other processing can be executed. In Embodiment 2, processing operations are described in which other processing is executed in addition to the programs above.

Figure 11:
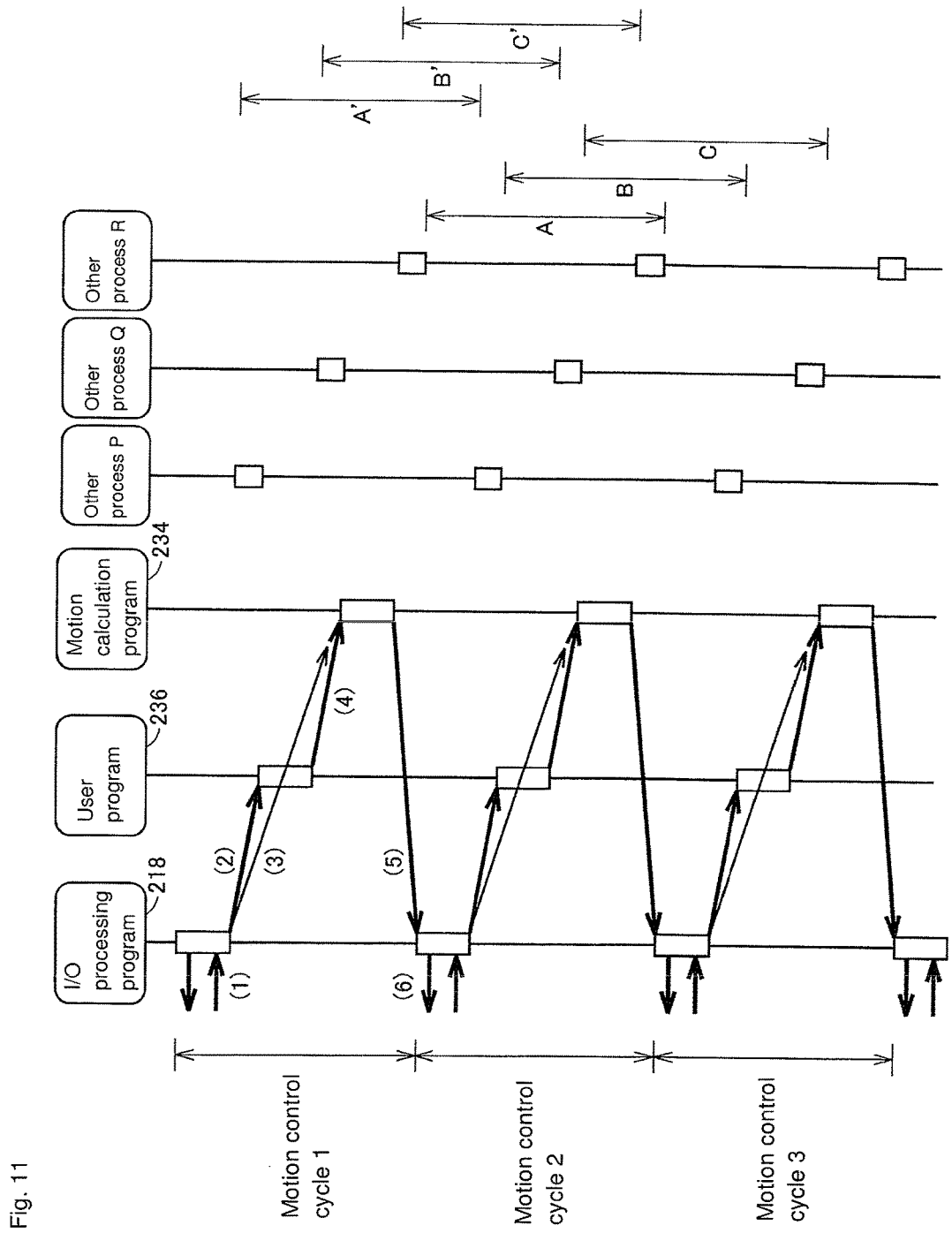
FIG. 11 A sequence diagram illustrating overall processing operations according to Embodiment 2 of the present invention.

FIG. 11 is a sequence diagram illustrating overall processing operations according to Embodiment 2 of the present invention. With reference to FIG. 11, in the present embodiment, "other processing P" is executed during a period from end of execution of the I/O processing program 218 to start of execution of the user program 236. Furthermore, "other processing Q" is executed during a period from end of execution of the user program 236 to start of execution of the motion calculation program 234. In addition, "other processing R" is executed during a period from end of execution of the motion calculation program 234 to start of execution of the I/O processing program 218.

The "other processing P," "other processing Q," and "other processing R" may be any processing unless the processing prevents normal execution of the user program 236 and the motion calculation program 234. More specifically, the "other processing" is assumed to be execution of the other system programs 220 (FIG. 3) and the like. Processes of the other system programs 220 may include, for instance, logging of input data and/or output data, malfunction diagnosis, communication with the PLC support device 8, and communication with a host computer over LAN (when the CPU unit 13 of the present embodiment has a function to communicate with the host computer over Ethernet®).

In addition, input processing and output processing associated with sequence calculation included in the user program 236 may be performed concurrently with input processing of input data for motion control and output processing of motion instruction value data during execution of the I/O processing program 218. Alternatively, the input processing and output processing may be performed at a separate timing as any of the "other processing."

When the "other processing" is executed at the end of a motion control cycle, the "other processing" may be idle to wait for start of the next motion control cycle.

FIG. 11 is exemplary processing in which three kinds of the "other processing" are executed. However, the number of the "other processing" is not particularly limited. For example, only one or two of the "other processing" may exist. Alternatively, a plurality of kinds of processing may be executed sequentially in a single "other processing."

In the sequence in FIG. 11, a range of one motion control cycle (from start to end) may be specified based on A, B, or C, which is a processing start timing of the "I/O processing program 218," "user program 236," or "motion calculation program 234," respectively. In addition, the range may be specified based on A', B', or C', which is a processing start timing of any of the "other processing."

<H. Overall Processing Operations (Embodiment 3)>

It is also practical to allow setting of different degrees of priority to user programs created according to user's control purposes. In Embodiment 3, processing operations are described in a case where there are a program with higher priority and a program with lower priority (hereinafter also referred to as "low-priority user program"). In the present embodiment, the user program 236 shown in FIG. 11 is also referred to as a "high-priority user program 236-1" in contrast with the low-priority user program.

Figure 12:
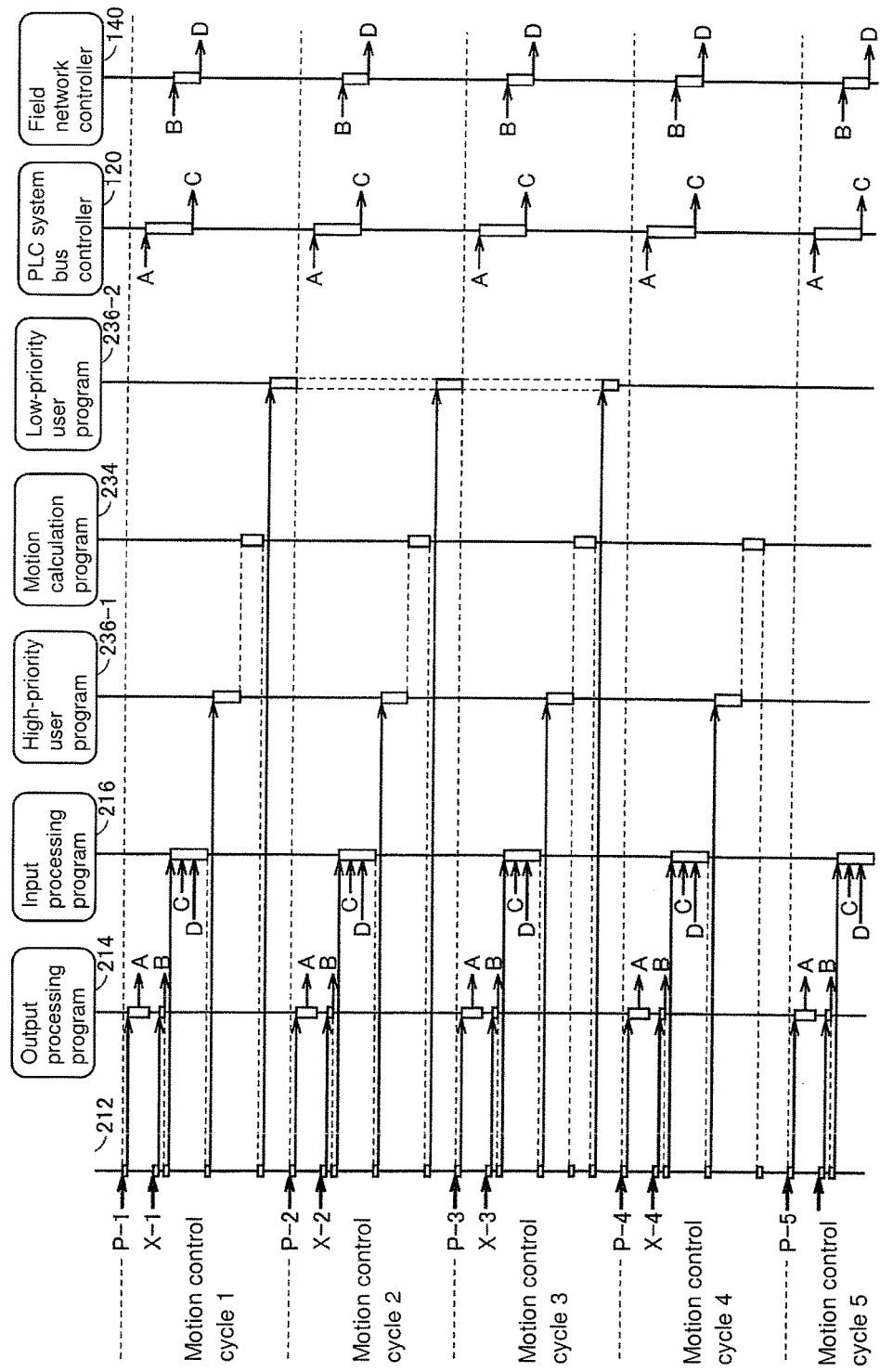
FIG. 12 A sequence diagram illustrating overall processing operations according to Embodiment 3 of the present invention.

FIG. 12 is a sequence diagram illustrating overall processing operations according to Embodiment 3 of the present invention. The sequence of FIG. 12 corresponds to a case where, in FIG. 11, the "other processing P" and "other processing Q" do not exist and a low-priority user program 236-2 (second user program) is executed as the "other processing R."

The high-priority user program 236-1 includes a command to calculate user program output data used for calculation in the motion calculation program 234 by using input data for motion control. Furthermore, the high-priority user program 236-1 includes a motion command. This motion command includes a command to provide parameters required for execution to the motion calculation program 234 and instruct the program to start execution. For instance, a user can program such that the motion command is executed when a certain condition is met based on input data indicating a state of the detection switch 6 (FIG. 1).

The low-priority user program 236-2 does not include the command to calculate the user program output data by using the input data for motion control. Typically, the low-priority user program 236-2 includes processing of a portion sufficient to be controlled slower than motion control.

The low-priority user program 236-2 is also stored in the non-volatile memory 106 (FIG. 2), similar to the user program 236 (FIG. 3), and is copied to the various program area 1041 (FIG. 4) assigned in the main memory 104 when executed.

As described above, the low-priority user program 236-2 includes processing of a portion sufficient to be controlled relatively slow. Thus, a period of execution cycle of the low-priority user program 236-2 is set to a period of integral multiple of two or more of a period of motion control cycle. In the sequence shown in FIG. 12, for example, the period of execution cycle of the low-priority user program 236-2 is set to a period four times the period of motion control cycle. Thus, the low-priority user program 236-2 is executed for motion control cycles 1 to 4 in FIG. 12 as one execution cycle.

For explanation purposes, different from FIGS. 9 to 11 above, an operation timing of the scheduler program 212 is indicated and the I/O processing program 218 is separated into the output processing program 214 and the input processing program 216 in the sequence diagram shown in FIG. 12. In addition, operation timings of the PLC system bus controller 120 and the field network controller 140 are also indicated in the sequence diagram shown in FIG. 12.

In the present embodiment, the high-priority user program 236-1 and the motion calculation program 234 are installed in one thread referred to as a motion control thread. Thus, the high-priority user program 236-1 and the motion calculation program 234 are sequentially executed without being controlled by the scheduler program 212. However, the motion calculation program 234 is considered to be executed and controlled by the scheduler program 212 through execution control of the entire motion control thread.

In the present embodiment, the high-priority user program 236-1 and the motion calculation program 234 are always executed sequentially. Thus, to facilitate understanding of control operations, the motion command is preferably included only in the high-priority user program 236-1 and not included in the low-priority user program 236-2.

In addition, the output processing program 214, the input processing program 216, the high-priority user program 236-1, and the motion calculation program 234 shown in FIG. 12 may be installed in one motion control thread. In this case, the scheduler program 212 may not be involved in an execution sequence of the programs and may control only start of the motion control thread. In this case as well, the scheduler program 212 is considered to perform processing to start executing each program included in the motion control thread by controlling a timing to start executing the motion control thread.

Specifically, in the present embodiment, that the scheduler program 212 starts executing any program is not necessarily limited to starting execution of the program individually.

The output processing program 214, the input processing program 216, the motion control thread (high-priority user program 236-1 and motion calculation program 234), and the low-priority user program 236-2 are each provided with a degree of priority. Priority of the programs and thread is, for example, in order from high to low of the output processing program 214, the input processing program 216, the motion control thread, and the low-priority user program 236-2.

The scheduler program 212 causes the microprocessor 100 to execute programs/threads in a high-priority order in each motion control cycle. To "cause the microprocessor 100 to execute" is also simply described as to "execute" hereinafter.

The scheduler program 212 itself is not limited to an object instance itself, but may be a program (process) incorporated into another object instance of various kinds (for example, output processing program 214) and operated. For example, the scheduler program 212 may be a program retrieved and operated in another object instance.

Reference symbols P and X in FIG. 12 each denote an interrupt signal generated from the system timer 108 for every constant period (FIG. 2). Specifically, "P" denotes an output preparation interrupt and "X" denotes a field network transmission interrupt. In FIG. 12, the reference symbols denoting interrupts "P" and "X" are suffixed with numerals that represent motion control cycle numbers.

(h1: Motion Control Cycle 1)

In response to the output preparation interrupt (P-1), the scheduler program 212 first executes the output processing program 214 in accordance with the degree of priority.

When any output data are to be transmitted through the PLC system bus 11, the output processing program 214 copies the output data to be transmitted from the control program work area 1042 (FIG. 4) to the PLC system bus transmission buffer 1043. When any output data are to be transmitted through the field network 2, the output processing program 214 copies the output data to be transmitted from the control program work area 1042 to the field network transmission buffer 1045. The output data include motion instruction value data as results of execution of the motion calculation program 234 and other output data as results of execution of the user program 236.

After completing copying the output data to the PLC system bus transmission buffer 1043, the output processing program 214 instructs the PLC system bus controller 120 to execute transmission (reference symbol A). After completing copying all the output data, the output processing program 214 pauses the execution.

Thereafter, in response to the field network transmission interrupt (X-1), the scheduler program 212 resumes execution of the output processing program 214.

After resuming the execution, the output processing program 214 instructs the field network controller 140 to execute transmission (reference symbol B). Then, the output processing program 214 ends execution thereof.

When the output processing program 214 ends the execution, the scheduler program 212 then executes the input processing program 216 in accordance with the degree of priority.

The input processing program 216 waits until receiving a reception completion notification (reference symbol C) from the PLC system bus controller 120 or a reception completion notification (reference symbol D) from the field network controller 140. FIG. 12 illustrates an example in which the reception completion notification (reference symbol C) from the PLC system bus controller 120 is generated first, and then the reception completion notification (reference symbol D) from the field network controller 140 is generated. There may be a case, however, where the sequence of generation is reversed.

When the reception completion notification (reference symbol C or D) is generated, the input processing program 216 copies input data to the control program work area 1042 from the PLC system bus reception buffer 1044 or the field network reception buffer 1046 depending on which reception completion notification is generated. The input data include input data for motion control and other input data required for execution of the user program 236.

Once completing copying the input data, the input processing program 216 ends the execution.

When the input processing program 216 ends the execution, the scheduler program 212 executes a motion control thread in accordance of the degree of priority. Specifically, the user program 236 starts execution.

The user program 236 calculates user program output data by using input data for motion control. The user program 236 generates other output data. When the user program 236 ends execution, the motion calculation program 234 starts execution. The motion calculation program 234 calculates motion instruction value data by using necessary data from the input data for motion control and the output data from the user program.

When the motion calculation program 234 ends execution, the scheduler program 212 executes the low-priority user program 236-2 at the end in accordance with the degree of priority. The execution of the low-priority user program 236-2 is interrupted in response to the output preparation interrupt (P-2) of the next motion control cycle.

When there is an interrupt for every constant period serving as a trigger to interrupt processing being executed and start a new series of processing, such as the output preparation interrupt (P), such an interrupt is preferably treated as a divider of the control cycle.

(h2: Operation of PLC System Bus Controller 120)

In response to the instruction to execute transmission (reference symbol A), the DMA control circuit 122 of the PLC system bus controller 120 transfers the output data stored in the PLC system bus transmission buffer 1043 of the main memory 104 to the buffer memory 126 of the PLC system bus controller 120.

Upon completion of the output data transfer to the buffer memory 126, the PLC system bus control circuit 124 transfers the output data to be transferred from the buffer memory 126 to a unit which is a destination of each output data. Thereafter, the PLC system bus control circuit 124 transfers input data to the buffer memory 126 of the PLC system bus controller 120 from each unit on the PLC system bus 11.

Upon completion of the input data transfer to the buffer memory 126, the DMA control circuit 122 of the PLC system bus controller 120 transfers the input data stored in the buffer memory 126 to the PLC system bus reception buffer 1044 of the main memory 104. Thereafter, upon completion of the input data transfer, the DMA control circuit 122 transmits a reception completion notification (reference symbol C) to the microprocessor 100.

(h3: Operation of Field Network Controller 140)

In response to the instruction to execute transmission (reference symbol B), the DMA control circuit 142 of the field network controller 140 transfers output data stored in the field network transmission buffer 1045 of the main memory 104 to the buffer memory 146 of the field network controller 140.

Upon completion of the output data transfer to the buffer memory 146, the field network control circuit 144 transfers the output data from the buffer memory 146 to a device which is a destination of each output data. Thereafter, the field network control circuit 144 transfers input data to the buffer memory 146 of the field network controller 140 from each device on the field network 2.

Upon completion of the input data transfer to the buffer memory 146, the DMA control circuit 142 of the field network controller 140 transfers the input data stored in the buffer memory 146 to the field network reception buffer 1046 of the main memory 104. Thereafter, upon completion of the input data transfer, the DMA control circuit 142 transmits a reception completion notification (reference symbol D) to the microprocessor 100.

The operations described above are carried out regardless of the type of the field network 2; however, when the field network 2 is EtherCAT® used in the present embodiment, the following processing is performed additionally.

Specifically, EtherCAT® includes the output data addressed to each unit and the input data from each unit in a single frame. When a frame is transmitted from the CPU unit 13 set as a master, the transmitted frame is sequentially transferred via each unit connected by a daisy chain. Each unit other than the CPU unit 13 is set as a slave. When the frame reaches a unit at an end, the frame doubles back in a full duplex communication channel and returns to the CPU unit 13 via each slave unit again. While an outbound frame passes in each slave in a FIFO (First In First Out) method, each slave selectively takes in the output data addressed to itself and also writes input data generated in itself in a proper position in the frame. Each slave lets a return frame pass itself without performing retrieval of the output data or writing of the input data.

As described above, in the case of EtherCAT®, a frame is not individually transmitted to each unit or individually received from each unit. Instead, transmission and reception of a single frame corresponds to transfer of output data from the buffer memory 146 to each unit and transfer of input data from each unit to the buffer memory 146 by the field network control 144.

In a case where EtherCAT® is employed as the field network 2, a frame containing output data is transmitted. When the frame returns via each slave unit, the frame contains input data. Thus, as an execution sequence, it is natural to perform input processing after output processing. However, depending on the type of the field network 2 being used, it may be preferable that the output processing be performed after the input processing. Thus, the sequence of the output processing and input processing may be designed as needed depending on specifications of the field network 2 or the like.

(h4: Motion Control Cycles 2 to 4)

Fundamentally, operations in motion control cycles 2 to 4 are the same as the operations in the motion control cycle 1. In the following, a description is mainly provided to differences from the motion control cycle 1.

In the motion control cycle 2, after ending execution of the motion calculation program 234, the scheduler program 212 executes an unexecuted portion of the low-priority user program 236-2. The execution of the low-priority user program 236-2 is interrupted again in response to the output preparation interrupt (P-2) of the next motion control cycle.

In the motion control cycle 3 as well, after ending execution of the motion calculation program 234, the scheduler program 212 executes an unexecuted portion of the low-priority user program 236-2. The sequence shown in FIG. 12 is an example in which the low-priority user program 236-2 ends execution in the motion control cycle 3. In this case, a time from the end of execution of the low-priority user program 236-2 to the output preparation interrupt (P-3) of the next motion control cycle is a standby time.

In the motion control cycle 4, the user program execution cycle of the low-priority user program 236-2 started in the motion control cycle 1 still continues. With no unexecuted portion of the low-priority user program 236-2, the scheduler program 212 determines that there is no program to execute after ending execution of the motion calculation program 234. Thus, a standby time is provided until the output preparation interrupt (P-4) of the next motion control cycle.

During the standby time of the programs executed and controlled by the scheduler program 212, the other system programs 220 (FIG. 3) may be executed under control of the realtime OS.

In the motion control cycle 5 and thereafter, operations similar to those in the motion control cycles 1 to 4 are repeated.

(h5: Summary)

In the present embodiment, when the low-priority user program 236-2 (second user program) is stored in the non-volatile memory 106 (FIG. 2), the scheduler program 212 causes the microprocessor 100 to start execution of the low-priority user program 236-2 during an extra time from the first end of execution of the motion calculation program 234 to the end of the motion control cycle, in the execution cycle of the low-priority user program 236-2 (user program execution cycle). When an unexecuted portion of the low-priority user program 236-2 remains during an extra time after execution of the motion calculation program 234 in the motion control cycle thereafter, the scheduler program 212 causes the microprocessor 100 to start execution of the unexecuted portion.

In the PLC 1 of the present embodiment, different degrees of priority are set to the user programs, which are executed in different execution cycles. This achieves functions and effects below. Specifically, the high-priority user program 236-1 includes the command to calculate the user program output data used for calculation in the motion calculation program 234 by using the input data for motion control, while the low-priority user program 236-2 includes the command to perform an entirety or portion of processing other than included in the high-priority user program 236-1. Then, compared to a case where the high-priority user program 236-1 includes commands to perform all processing, a processing load assigned to the high-priority user program 236-1 is reduced, and thus an execution time of the high-priority user program 236-1 can be reduced. Accordingly, this leads to a possibility of further reducing the period of the motion control cycle.

This then allows appropriate output processing of the motion instruction value data and the input processing of the input data for motion control, the execution of the high-priority user program 236-1, and the execution of the motion calculation program 234 in a shorter period of the motion control cycle.

(h6: Modifications)

The sequence shown in FIG. 12 is an example in which the field network controller 140 receives an instruction of transmission execution (reference symbol B) from the scheduler program 212. Instead of this configuration, the field network controller 140 may receive an interrupt signal directly from the system timer 108 to execute transmission.

Without copying data following the commands from the output processing program 214 and the input processing program 216, the user program 236 and/or the motion calculation program 234 may directly access the field network transmission buffer 1045 and/or the field network reception buffer 1046.

The output processing and input processing of data through the PLC system bus 11 may also be executed independently from the scheduler program 212. Thus, the CPU unit 13 may be configured so as to execute the output processing and input processing independently from the scheduler program 212. In other words, the scheduler program 212 necessarily need not start execution of the output processing and input processing.

In this case, for example, the microprocessor 100 is preferably configured so as not to access the transmission buffer and the reception buffer in the main memory 104 until the reception completion notification (symbols C and D) is generated in response to the output preparation interrupt (P).

<I. Overall Processing Operations (Embodiment 4)>

In Embodiment 1 above, an processing example is described in which a period of an execution cycle of the user program 236 (user program execution cycle) is identical to a period of a motion control cycle. In contrast, a processing example is described in Embodiment 4, in which a period of a user program execution cycle is integral multiple of two or more of a period of a motion control cycle.

i1: Present Embodiment

Figure 13:
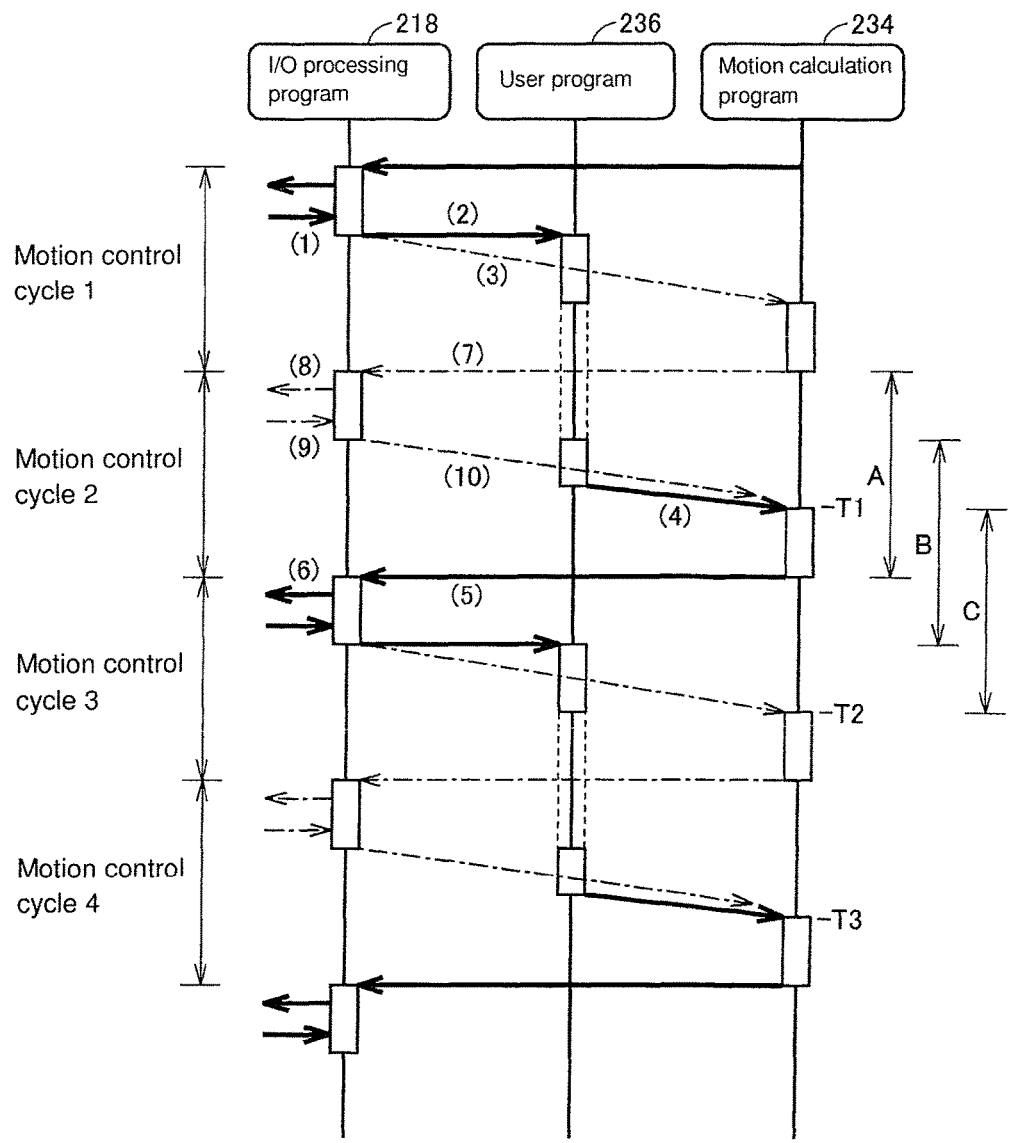
FIG. 13 A sequence diagram illustrating overall processing operations according to Embodiment 4 of the present invention.

FIG. 13 is a sequence diagram illustrating overall processing operations according to Embodiment 4 of the present invention. The sequence shown in FIG. 13 is a case in which a period of a user program execution cycle is integral multiple of two or more of a period of a motion control cycle. A period of an execution cycle of the I/O processing program 218 and the motion calculation program 234 is identical to the period of the motion control cycle.

Since processes (1) to (6) in FIG. 13 are similar to processes (1) to (6), respectively, in FIG. 9, differences from the sequence in FIG. 9 are mainly described below.

Specifically, when the motion calculation program 234 starts execution in a first motion control cycle 1 in the sequence shown in FIG. 13, no user program output data exist yet calculated from input data for motion control (process (4)). Thus, according to a command from the motion calculation program 234, motion instruction value data is calculated using only the input data for motion control (process (3)). The calculated motion instruction value data is transferred to the work area associated with the I/O processing program 218 (process (7)). Furthermore, according to a command from the I/O processing program 218, the transferred motion instruction value data is output (process (8)).

Thereafter, the field network controller 140 receives new input data for motion control and stores the new input data in the field network reception buffer 1046 (FIG. 4), and/or the PLC system bus controller 120 receives new input data for motion control and stores the new input data in the PLC system bus reception buffer 1044 (FIG. 4) (process (9)).

Then, according to a command from the I/O processing program 218, the new input data for motion control stored in the field network reception buffer 1046 and/or the PLC system bus reception buffer 1044 are transferred to the work area associated with the motion calculation program 234 (process (10)).

In a motion control cycle 2 in the sequence, according to a command from the motion calculation program 234, a motion instruction value is calculated using necessary data from the new input data for motion control (process (10)) and the user program output data (process (4)). Then, the calculated motion instruction value data is transferred to the work area associated with the I/O processing program 218. Finally, the calculated motion instruction value data is output according to an instruction from the I/O processing program 218 (processes (5) and (6)).

With reference to FIG. 13, the period of the user program execution cycle need not be identical to the period of the motion control cycle. Generally, the period of the user program execution cycle can also be integral multiple of two or more of the period of the motion control cycle.

According to the present embodiment, updated motion instruction value data can be output in a shorter control period than the execution period of the user program 236. In this case, updating motion instruction value data by using input data for motion control and reflecting user program output data calculated by the user program 236 can be performed only in each user program execution cycle. However, even in a motion control cycle in which such reflection cannot be performed, there is a case where motion of a motor can be controlled more smoothly by updating and outputting motion instruction value data.

For example, the present embodiment is suitably applied to Application Example 3 (FIG. 8) described above. The instruction value for the main axis and the instruction value for the sub-axis associated with the drive wheels of the carrier vehicle 710 are updated and output for every motion control cycle. Meanwhile, the position of the auxiliary axis that provides a difference (correction value) between the instruction position for the main axis and the instruction value for the sub-axis is updated for every user program execution cycle. In this case, a period of updating the position for the auxiliary axis is longer than a period of updating the instruction value for the main axis and the instruction value for the sub-axis. This hardly matters, however, in the case of Application Example 3. The short period of updating the instruction value is rather advantageous. Moreover, that the instruction value for the sub-axis can also be corrected using the auxiliary axis is advantageous even in a period longer than the period of updating the instruction value.

In the sequence shown in FIG. 13 as well, a range of the motion control cycle can be divided based on any of A, B, or C, similar to Embodiment 1 (FIG. 9). When divided based on A or B, execution control (typically, an interrupt signal is used) needs to be implemented to interrupt execution of the user program 236 during each motion control cycle and to start execution of the motion calculation program 234.

When divided based on C, the user program execution cycle is possibly further shortened. Specifically, based on C, the scheduler program 212 includes a command to cause the microprocessor 100 to execute the motion calculation program 234, perform output processing and input processing, and execute the user program 236 in this sequence in the user program execution cycle (for example, from T1 to T3 in FIG. 13). As a result, the motion calculation program, the output processing and input processing, and the first user program are executed in this sequence in each motion control cycle (from T1 to T2 and from T2 to T3) as well. In each motion control cycle, a time after the execution of the output processing and input processing until the end of the motion control cycle may vary depending on the motion control cycle. This processing sequence, however, allows the time to be used for execution of the user program 236 with no waste. Thus, a standby time is unlikely to occur in the microprocessor 100, thus leading to a possibility of a further reduction in the user program execution cycle.

i2: Comparative Example

To describe effects of the scheduler program 212 of the present embodiment, a comparative example is described below in which a sequence of program execution is different from the sequence shown in FIG. 13.

Figure 14:
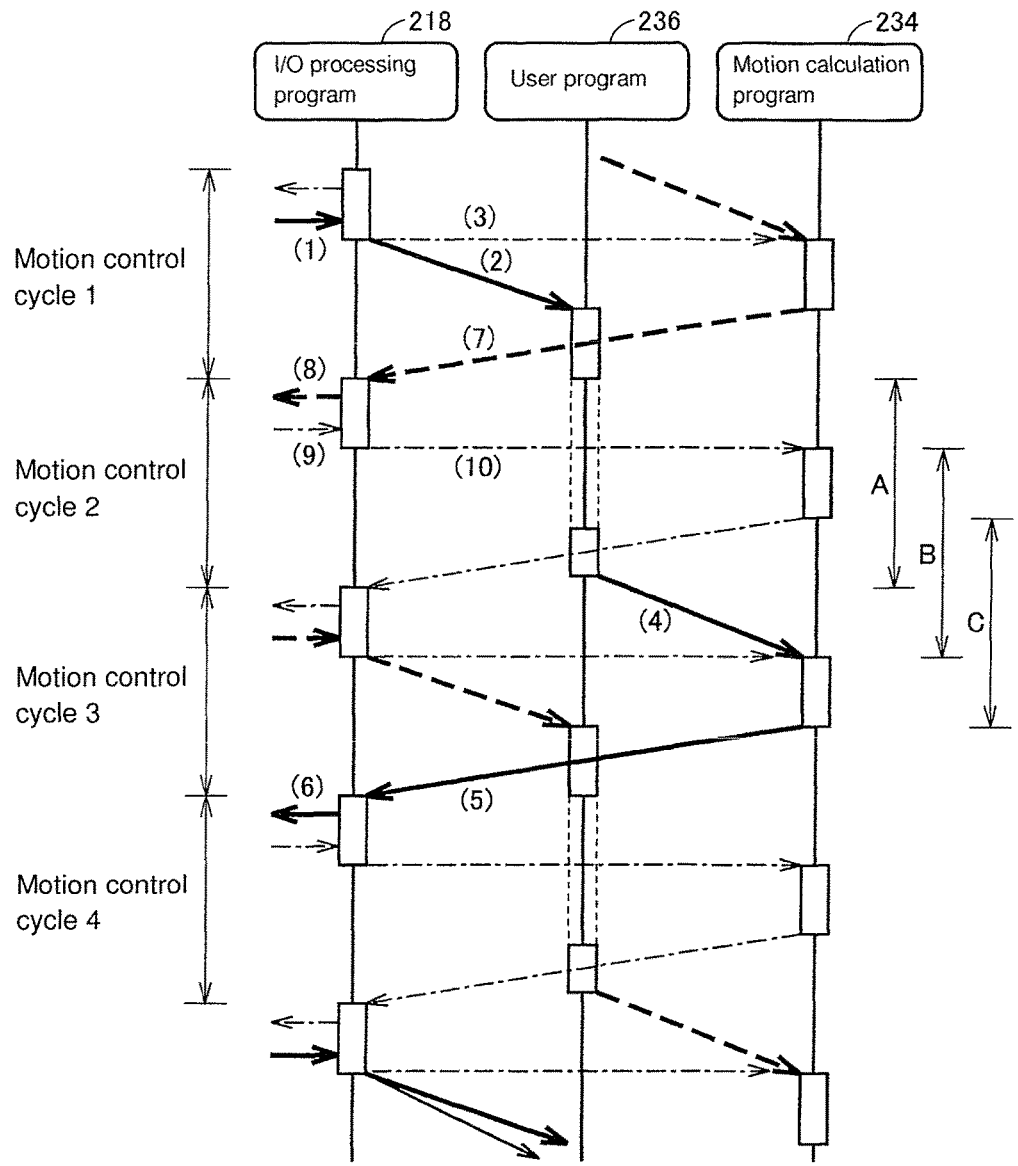
FIG. 14 A sequence diagram illustrating overall processing operations in a comparative example associated with the overall processing operations illustrated in FIG. 13.

FIG. 14 is a sequence diagram illustrating overall processing operations in the comparative example associated with the overall processing operations illustrated in FIG. 13. In the example in FIG. 13 above, the programs are executed in the sequence of the "I/O processing program 218," "user program 236," and "motion calculation program 234." In the comparative example in FIG. 14, the programs are executed in the sequence of the "I/O processing program 218," "motion calculation program 234," and "user program 236."

In the case of the sequence of program execution in the comparative example shown in FIG. 14, a time equivalent to three periods of a motion control cycle, specifically, a time longer by one period of the motion control cycle than a period of a user program execution cycle, is required from start of input processing (process (1) in FIG. 14) to output processing of motion instruction value data reflecting input data for motion control input in the input processing (process (6) in FIG. 14). As a result, compared to the sequence of program execution shown in FIG. 13, control is delayed for a time of one period of the motion control cycle.

<J. Support Device>

The PLC support device 8 is described that creates a program executed on the PLC 1 and performs maintenance and the like of the PLC 1.

Figure 15:
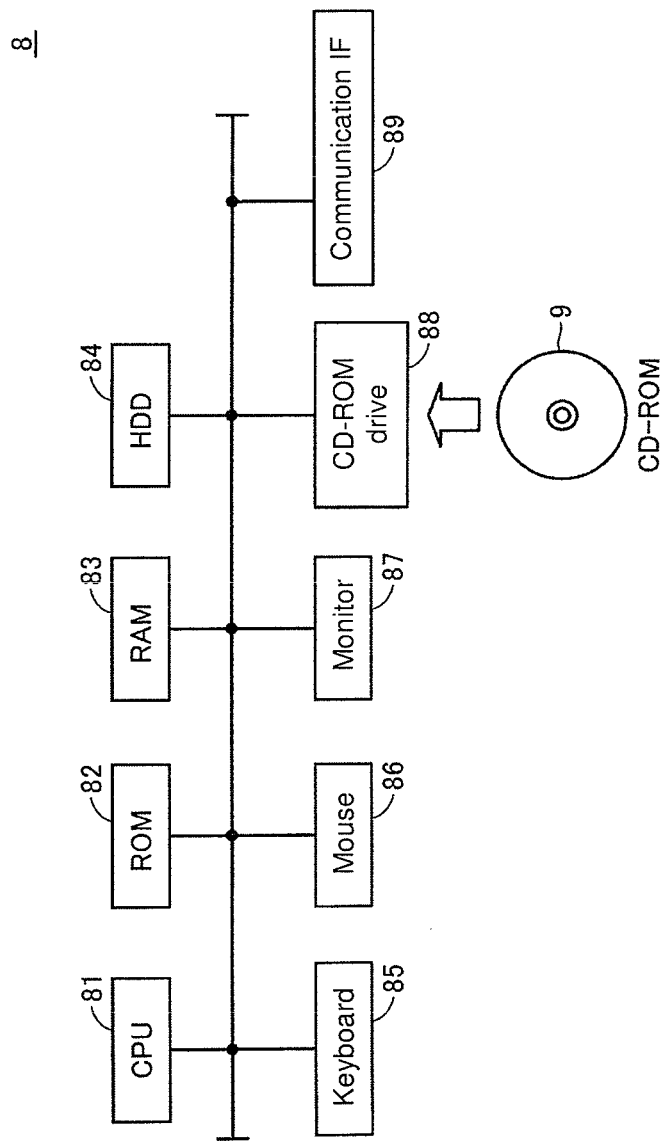
FIG. 15 A schematic view illustrating a hardware configuration of a PLC support device connected to the CPU unit according to the embodiments of the present invention.

FIG. 15 is a schematic view illustrating a hardware configuration of the PLC support device 8 connected to the CPU unit according to the embodiments of the present invention. With reference to FIG. 15, the PLC support device 8 is typically a universal computer. In view of ease of maintenance, a portable laptop computer is preferred.

With reference to FIG. 15, the PLC support device 8 has a CPU 81 executing various programs, including an OS, a ROM (Read Only Memory) 82 storing a BIOS and various data, a memory RAM 83 providing a work area to store data required for execution of a program by the CPU 81, and a hard disk (HDD) 84 storing the programs executed by the CPU 81 in a non-volatile manner.

The PLC support device 8 further includes a keyboard 85 and mouse 86 receiving operation by a user, and a monitor 87 displaying information to the user. Furthermore, the PLC support device 8 includes a communication interface (IF) 89 to communicate with the PLC 1 (CPU unit 13) and the like.

As described later, the various programs executed in the PLC support device 8 are stored in a CD-ROM 9 for distribution. The programs stored in this CD-ROM 9 are read by a CD-ROM (Compact Disk-Read Only Memory) drive 88 and are stored in the hard disk (HDD) 84 and the like. Alternatively, a program may be downloaded via a network from a superordinate host computer and the like.

As described above, the PLC support device 8 is embodied with a universal computer, and a further description for the PLC support device 8 is thus omitted.

Figure 16:
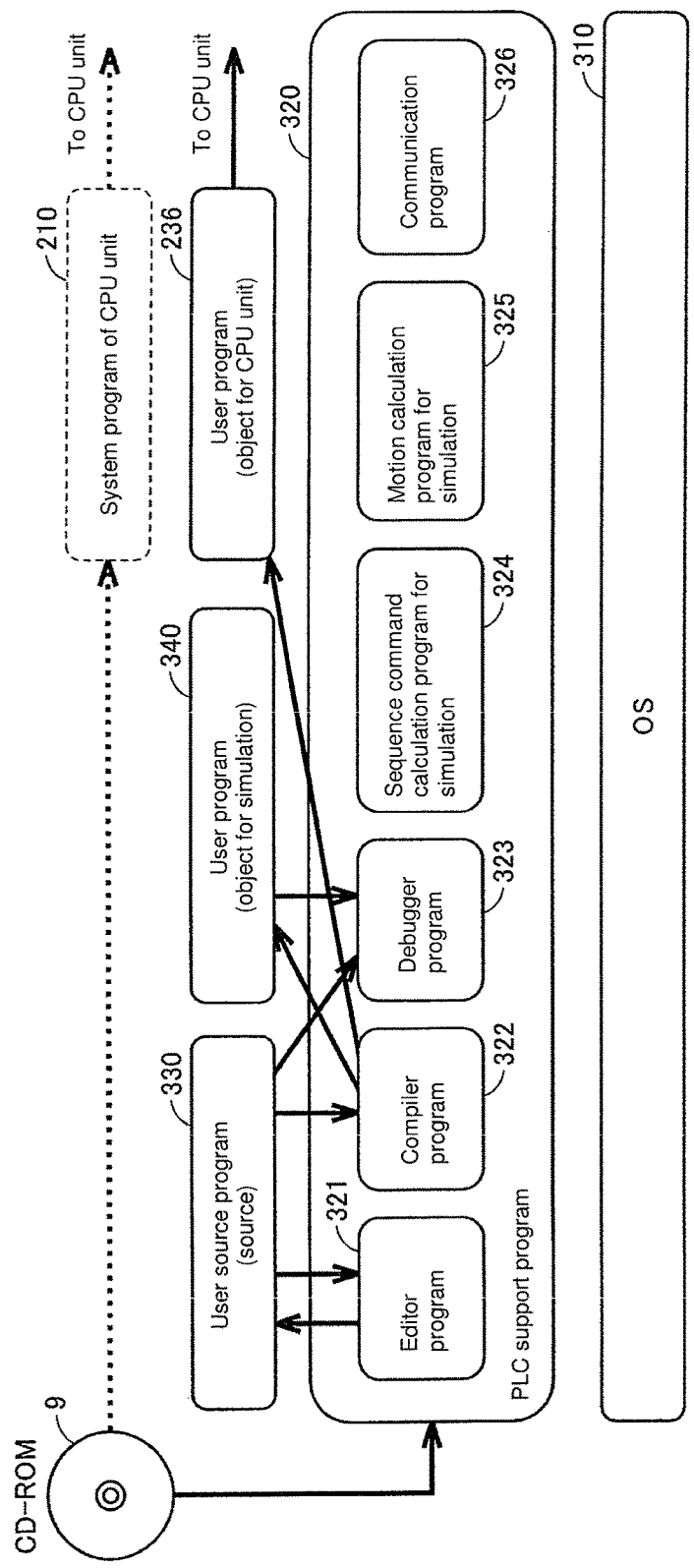
FIG. 16 A schematic view illustrating a software configuration of the PLC support device connected to the CPU unit according to the embodiments of the present invention.

FIG. 16 is a schematic view illustrating a software configuration of the PLC support device 8 connected to the CPU unit according to the embodiments of the present invention. With reference to FIG. 16, an OS 310 is executed in the PLC support device 8 in order to provide an environment in which various programs included in a PLC support program 320 can be executed.

The PLC support program 320 includes an editor program 321, a compiler program 322, a debugger program 323, a sequence command calculation program for simulation 324, a motion calculation program for simulation 325, and a communication program 326. Each program included in the PLC support program 320 is typically distributed in the CD-ROM 9 and is installed in the PLC support device 8.

The editor program 321 provides functions such as input and editing to create a user program 236. More specifically, in addition to a function with which a user creates a source program 330 of the user program 236 by operating the keyboard 85 and the mouse 86, the editor program 321 provides functions to save and edit the created source program 330. Further, the editor program 321 receives input of the source program 330 from outside.

The compiler program 322 compiles the source program 330 and generates the user program 236 in an object program format that can be executed by the microprocessor 100 of the CPU unit 13. In addition, the compiler program 322 compiles the source program 330 and generates a user program 340 in an object program format that can be executed by the CPU 81 of the PLC support device 8. This user program 340 is an object program for simulation used to simulate (imitate) operation of the PLC 1 with the PLC support device 8.

The debugger program 323 debugs a source program of a user program. The debugging includes operations such as partial execution of a user designated portion of a source program and tracking of temporal change in a variable value during execution of the source program.

The debugger program 323 further executes the user program 340, which is an object program for simulation. At the time of the simulation, the sequence command calculation program for simulation 324 and the motion calculation program for simulation 325 included in the PLC support program 320 are used in replacement of the sequence command calculation program 232 and the motion calculation program 234 included in the system program of the CPU unit 13.

The communication program 326 transfers the user program 236 to the CPU unit 13 of the PLC 1.

In general, the system program 210 installed in the PLC 1 is stored in the non-volatile memory 106 of the CPU unit 13 at a stage of manufacturing the CPU unit 13. However, when the system program 210 is stored in the CD-ROM 9, a user can copy the system program 210 in the CD-ROM 9 to the PLC support device 8 and transfer the copied system program 210 to the CPU unit 13, using the function provided by the communication program 326. Moreover, when a realtime OS 200 executed by the CPU unit 13 of the PLC 1 is stored in CD-ROM 9, the realtime OS 200 can be also re-installed in the PLC 1 by a user operation.

The embodiments disclosed here should be considered as mere examples and not as limitation of the present invention in all aspects. The scope of the present invention is indicated not by the description above but by the scope of claims. The scope of the present invention is intended to include all modifications without departing from the scope of the claims and the meaning and scope of equivalents.

REFERENCE SIGNS LIST

1: PLC
2: Field network
3: Servo motor driver
4: Servo motor
5: Remote I/O terminal
6: Detection switch
7: Relay
8: PLC support device
9: CD-ROM
10: Connection cable
11: PLC system bus
12: Power supply unit
13: CPU unit
14, 53: I/O unit
15: Specialty unit
51: Remote I/O terminal bus
52: Communication coupler
81: CPU
83: RAM
85: Keyboard
86: Mouse
87: Monitor
88: CD-ROM drive
100: Microprocessor
102: Chip set
104: Main memory
106: Non-volatile memory
108: System timer
110: USB connector
120: PLC system bus controller
122: DMA control circuit
124: PLC system bus control circuit
126, 146: Buffer memory
130: PLC system bus connector
140: Field network controller
142: DMA control circuit
144: Field network control circuit
210: System program
212: Scheduler program
214: Output processing program
216: Input processing program
218: I/O processing program
220: Other system programs
222: Motion control cycle period setting program
230: Control program
232: Sequence command calculation program
234: Motion calculation program
236: User program
236-1: High-priority user program
236-2: Low-priority user program
320: PLC support program
321: Editor program
322: Compiler program
323: Debugger program
324: Sequence command calculation program for simulation
325: Motion calculation program for simulation
326: Communication program
330: Source program
340: User program
500: Winding device
502, 602: Sheet material 504, 606, 614, 714, 724: Motor
506, 718, 728: Driver
510, 518: Position sensor
512: Roller for tension detection
514: Tension roller
516: Roller for wound diameter detection
520, 612, 618: Roller
600: Cutting device
604: Cutter
610: Sensor
624, 716, 726: rotary encoder
630: Mark
700: Carrier system
702: Rail
710: Carrier vehicle
712, 722: Drive wheel
1041: Program area
1042: Control program work area
1043: PLC system bus transmission buffer
1044: PLC system bus reception buffer
1045: Field network transmission buffer
1046: Field network reception buffer
SYS: PLC system

The invention claimed is:

1. A Central Processing Unit (CPU) of a Programmable Controller (PLC) having a motion control function to control motion of a motor, the CPU of the PLC comprising:
    a microprocessor;
    a memory storing a system program and a user program, the system program comprising a motion calculation program and a scheduler program; and
    a communication circuit, in each motion control cycle:
        transmitting motion instruction value data as at least a portion of an output processing, and
        receiving input data for motion control as at least a portion of an input processing,
    wherein
        the scheduler program is configured to cause the microprocessor, for the each motion control cycle, to:
            perform an input/output processing including the output processing of transmitting motion instruction value data calculated in a previous motion control cycle to an external output device, and the input processing of receiving the input data for motion control from an external input device,
            start execution of the user program after completion of the input/output processing, the user program calculating user program output data by using the input data for motion control, and
            start execution of the motion calculation program after completion of the user program, the motion calculation program calculating the motion instruction value data by using the input data for motion control and the user program output data so that the motion instruction value data is ready to be output during input/output processing in a next motion control cycle, and
        the microprocessor of the CPU of the PLC executes the scheduler program, the user program and the motion calculation program.

2. A non-transitory recording medium storing a Programmable Controller (PLC) system program executed in a Central Processing Unit (CPU) of a PLC having a motion control function to control motion of a motor, the CPU of the PLC comprising:
    a memory storing a system program and a user program, the system program comprising a motion calculation program and a scheduler program;
    a microprocessor; and
    a communication circuit, in each motion control cycle:
        transmitting motion instruction value data as at least a portion of an output processing, and
        receiving input data for motion control as at least a portion of an input processing,
    wherein the scheduler program is configured to cause the microprocessor, for the each motion control cycle, to:
        perform an input/output processing including the output processing of transmitting motion instruction value data calculated in a previous motion control cycle to an external output device and the input processing of receiving the input data for motion control from an external input device,
        start execution of the user program after completion of the input/output processing, the user program calculating user program output data by using the input data for motion control, and
        start execution of the motion calculation program after completion of the user program, the motion calculation program calculating the motion instruction value data by using the input data for motion control and the user program output data so that the motion instruction value data is ready to be output during input/output processing in a next motion control cycle, and
    the microprocessor of the CPU of the PLC executes the scheduler program, the user program and the motion calculation program.

3. A Central Processing Unit (CPU) of a Programmable Controller (PLC) having a motion control function to control motion of a motor, the CPU of the PLC comprising:
    a microprocessor;
    a memory storing a system program and a user program, the system program comprising a motion calculation program and a scheduler program; and
    a communication circuit, in each motion control cycle:
        transmitting motion instruction value data as at least a portion of an output processing, and
        receiving input data for motion control as at least a portion of an input processing,
    wherein
        the scheduler program is configured to cause the microprocessor, for the each motion control cycle, to:
            start execution of the user program, the user program calculating user program output data by using the input data for motion control received in a previous motion control cycle,
            start execution of the motion calculation program after completion of the user program, the motion calculation program calculating the motion instruction value data by using the input data for motion control received in the previous motion control cycle and the user program output data, and
            perform an input/output processing including the output processing of transmitting the motion instruction value data to an external output device, and the input processing of receiving the input data for motion control from an external input device, and
    the microprocessor of the CPU of the PLC executes the scheduler program, the user program and the motion calculation program.

4. A Central Processing Unit (CPU) of a Programmable Controller (PLC) having a motion control function to control motion of a motor, the CPU of the PLC comprising:
a microprocessor;
a memory storing a system program and a user program, the system program comprising a motion calculation program and a scheduler program; and
a communication circuit, in each motion control cycle:
transmitting motion instruction value data as at least a portion of an output processing, and
receiving input data for motion control as at least a portion of an input processing,
wherein
the scheduler program is configured to cause the microprocessor, for the each motion control cycle, to:
start execution of the motion calculation program, the motion calculation program calculating the motion instruction value data by using the input data for motion control received in a previous motion control cycle and user program output data calculated in the previous motion control cycle, and
perform an input/output processing including the output processing of transmitting the motion instruction value data to an external output device, and the input processing of receiving the input data for motion control from an external input device,
start execution of the user program, the user program calculating the user program output data by using the input data for motion control, and
the microprocessor of the CPU of the PLC executes the scheduler program, the user program and the motion calculation program.

5. A Central Processing Unit (CPU) of a Programmable Controller (PLC) having a motion control function to control motion of a motor, the CPU of the PLC comprising:
a microprocessor;
a memory storing a system program and a user program, the system program comprising a motion calculation program and a scheduler program, the scheduler program being configured to generate a motion control cycle and a user program execution cycle, the user program execution cycle including a plural number of the motion control cycles; and
a communication circuit, in each motion control cycle:
transmitting motion instruction value data as at least a portion of an output processing, and
receiving input data for motion control as at least a portion of an input processing,
wherein
the scheduler program is configured to cause the microprocessor, for the each motion control cycle, to:
perform an input/output processing including the output processing of transmitting the motion instruction value data calculated in a previous motion control cycle, and the input processing of receiving the input data for motion control,
in a case that the current motion control cycle is a first cycle in the user program execution cycle, start execution of the user program after completion of the input/output processing, the user program calculating user program output data by using the input data for motion control,
in a case that the current motion control cycle is a cycle other than the first cycle in the user program execution cycle and there is an unexecuted portion in the user program, start execution of the unexecuted portion in the user program after completion of the input/output processing, and
start execution of the motion calculation program after completion or interruption of the user program, the motion calculation program calculating the motion instruction value data by using the input data for motion control and the user program output data when, as for the user program output data, the user program output data is available by completion of the user program in the current motion control cycle.

6. A Central Processing Unit (CPU) of a Programmable Controller (PLC) having a motion control function to control motion of a motor, the CPU of the PLC comprising:
a microprocessor;
a memory storing a system program and a user program, the system program comprising a motion calculation program and a scheduler program, the scheduler program being configured to generate a motion control cycle and a user program execution cycle, the user program execution cycle including a plural number of the motion control cycles; and
a communication circuit, in each motion control cycle:
transmitting motion instruction value data as at least a portion of an output processing, and
receiving input data for motion control as at least a portion of an input processing,
wherein
the scheduler program is configured to cause the microprocessor, for the each motion control cycle, to:
in a case that the current motion control cycle is a first cycle in the user program execution cycle, start execution of the user program, the user program calculating user program output data by using the input data for motion control received in a previous motion control cycle,
in a case that the current motion control cycle is a cycle other than the first cycle in the user program execution cycle and there is an unexecuted portion in the user program, start execution of the unexecuted portion in the user program,
start execution of the motion calculation program after completion or interruption of the user program, the motion calculation program calculating the motion instruction value data by using the input data for motion control received in the previous motion control cycle and the user program output data when, as for the user program output data, the user program output data is available by completion of the user program in the current motion control cycle, and
perform an input/output processing including the output processing of transmitting the motion instruction value data, and the input processing of receiving the input data for motion control.

7. A Central Processing Unit (CPU) of a Programmable Controller (PLC) having a motion control function to control motion of a motor, the CPU of the PLC comprising:
a microprocessor;
a memory storing a system program and a user program, the system program comprising a motion calculation program and a scheduler program, the scheduler program being configured to generate a motion control cycle and a user program execution cycle, the user program execution cycle including a plural number of the motion control cycles; and a communication circuit, in each motion control cycle:
- transmitting motion instruction value data as at least a portion of an output processing, and
- receiving input data for motion control as at least a portion of an input processing, wherein
the scheduler program is configured to cause the microprocessor, for the each motion control cycle, to:
- start execution of the motion calculation program, the motion calculation program calculating the motion instruction value data by using the input data for motion control received in a previous motion control cycle and user program output data when the user program output data is available by completion of the user program in the previous motion control cycle,
- perform an input/output processing including the output processing of transmitting the motion instruction value data, and the input processing of receiving the input data for motion control,
- in a case that the current motion control cycle is a first cycle in the user program execution cycle, start execution of the user program, the user program calculating the user program output data by using the input data for motion control, and
- in a case that the current motion control cycle is a cycle other than the first cycle in the user program execution cycle and there is an unexecuted portion in the user program, start execution of the unexecuted portion in the user program.

8. A non-transitory recording medium storing a Programmable Controller (PLC) system program executed in a Central Processing Unit (CPU) of a Programmable Controller (PLC) having a motion control function to control motion of a motor, the CPU of the PLC comprising:
- a microprocessor;
- a memory storing a system program and a user program, the system program comprising a motion calculation program and a scheduler program; and
- a communication circuit, wherein the PLC system program, when executed by the microprocessor, causes the communication circuit to, in each motion control cycle:
- transmit motion instruction value data as at least a portion of an output processing, and
- receive input data for motion control as at least a portion of an input processing, and wherein the scheduler program is configured to cause the microprocessor, for the each motion control cycle, to:
- start execution of the user program, the user program calculating user program output data by using the input data for motion control received in a previous motion control cycle,
- start execution of the motion calculation program after completion of the user program, the motion calculation program calculating the motion instruction value data by using the input data for motion control received in the previous motion control cycle and the user program output data, and
- perform an input/output processing including the output processing of transmitting the motion instruction value data to an external output device, and the input processing of receiving the input data for motion control from an external input device, and the microprocessor of the CPU of the PLC executes the scheduler program, the user program and the motion calculation program.

9. A non-transitory recording medium storing a Programmable Controller (PLC) system program executed in a Central Processing Unit (CPU) of a Programmable Controller (PLC) having a motion control function to control motion of a motor, the CPU of the PLC comprising:
- a microprocessor;
- a memory storing a system program and a user program, the system program comprising a motion calculation program and a scheduler program; and
- a communication circuit, wherein the PLC system program, when executed by the microprocessor, causes the communication circuit to, in each motion control cycle:
- transmit motion instruction value data as at least a portion of an output processing, and
- receive input data for motion control as at least a portion of an input processing, and wherein the scheduler program is configured to cause the microprocessor, for the each motion control cycle, to:
- start execution of the motion calculation program, the motion calculation program calculating the motion instruction value data by using the input data for motion control received in a previous motion control cycle and user program output data calculated in the previous motion control cycle, and
- perform an input/output processing including the output processing of transmitting the motion instruction value data cycle to an external output device, and the input processing of receiving the input data for motion control from an external input device,
- start execution of the user program, the user program calculating the user program output data by using the input data for motion control, and the microprocessor of the CPU of the PLC executes the scheduler program, the user program and the motion calculation program.

10. A non-transitory recording medium storing a Programmable Controller (PLC) system program executed in a Central Processing Unit (CPU) of a Programmable Controller (PLC) having a motion control function to control motion of a motor, the CPU of the PLC comprising:
- a microprocessor;
- a memory storing a system program and a user program, the system program comprising a motion calculation program and a scheduler program, the scheduler program being configured to generate a motion control cycle and a user program execution cycle, the user program execution cycle including a plural number of the motion control cycles; and
- a communication circuit, wherein the PLC system program, when executed by the microprocessor, causes the communication circuit to, in each motion control cycle:
- transmit motion instruction value data as at least a portion of an output processing, and
- receive input data for motion control as at least a portion of an input processing, and wherein the scheduler program is configured to cause the microprocessor, for the each motion control cycle, to:
- perform an input/output processing including the output processing of transmitting the motion instruction value data calculated in a previous motion control cycle, and the input processing of receiving the input data for motion control, in a case that the current motion control cycle is a first cycle in the user program execution cycle, start execution of the user program after completion of the input/output processing, the user program calculating user program output data by using the input data for motion control, in a case that the current motion control cycle is a cycle other than the first cycle in the user program execution cycle and there is an unexecuted portion in the user program, start execution of the unexecuted portion in the user program after completion of the input/output processing, and start execution of the motion calculation program after completion or interruption of the user program, the motion calculation program calculating the motion instruction value data by using the input data for motion control and the user program output data when, as for the user program output data, the user program output data is available by completion of the user program in the current motion control cycle.

11. A non-transitory recording medium storing a Programmable Controller (PLC) system program executed in a Central Processing Unit (CPU) of a Programmable Controller (PLC) having a motion control function to control motion of a motor, the CPU of the PLC comprising:
a microprocessor;
a memory storing a system program and a user program, the system program comprising a motion calculation program and a scheduler program, the scheduler program being configured to generate a motion control cycle and a user program execution cycle, the user program execution cycle including a plural number of the motion control cycles; and
a communication circuit, wherein the PLC system program, when executed by the microprocessor, causes the communication circuit to, in each motion control cycle:
transmit motion instruction value data as at least a portion of an output processing, and
receive input data for motion control as at least a portion of an input processing, and wherein the scheduler program is configured to cause the microprocessor, for the each motion control cycle, to:
in a case that the current motion control cycle is a first cycle in the user program execution cycle, start execution of the user program, the user program calculating user program output data by using the input data for motion control received in a previous motion control cycle, in a case that the current motion control cycle is a cycle other than the first cycle in the user program execution cycle and there is an unexecuted portion in the user program, start execution of the unexecuted portion in the user program, start execution of the motion calculation program after completion or interruption of the user program, the motion calculation program calculating the motion instruction value data by using the input data for motion control received in the previous motion control cycle and the user program output data when, as for the user program output data, the user program output data is available by completion of the user program in the current motion control cycle, and perform an input/output processing including the output processing of transmitting the motion instruction value data, and the input processing of receiving the input data for motion control.

12. A non-transitory recording medium storing a Programmable Controller (PLC) system program executed in a Central Processing Unit (CPU) of a Programmable Controller (PLC) having a motion control function to control motion of a motor, the CPU of the PLC comprising:
a microprocessor;
a memory storing a system program and a user program, the system program comprising a motion calculation program and a scheduler program, the scheduler program being configured to generate a motion control cycle and a user program execution cycle, the user program execution cycle including a plural number of the motion control cycles; and
a communication circuit, wherein the PLC system program, when executed by the microprocessor, causes the communication circuit to, in each motion control cycle:
transmit motion instruction value data as at least a portion of an output processing, and
receive input data for motion control as at least a portion of an input processing, and wherein the scheduler program is configured to cause the microprocessor, for the each motion control cycle, to:
start execution of the motion calculation program, the motion calculation program calculating the motion instruction value data by using the input data for motion control received in a previous motion control cycle and the user program output data when the user program output data is available by completion of the user program in the previous motion control cycle, perform an input/output processing including the output processing of transmitting the motion instruction value data, and the input processing of receiving the input data for motion control, in a case that the current motion control cycle is a first cycle in the user program execution cycle, start execution of the user program, the user program calculating user program output data by using the input data for motion control, and in a case that the current motion control cycle is a cycle other than the first cycle in the user program execution cycle and there is an unexecuted portion in the user program, start execution of the unexecuted portion in the user program.

* * * * *